United States Patent [19]
Greenwald

[11] Patent Number: 5,970,427
[45] Date of Patent: Oct. 19, 1999

[54] DISK BRAKE TESTING DEVICE AND SYSTEM EMPLOYING THE SAME

[75] Inventor: Christopher L. Greenwald, Concord, N.H.

[73] Assignee: Pro-Cut Licensing, L.L.C., West Lebanon, N.H.

[21] Appl. No.: 09/243,499

[22] Filed: Feb. 3, 1999

[51] Int. Cl.⁶ .................................................. F16D 66/00
[52] U.S. Cl. .................. 702/33; 33/610; 73/121
[58] Field of Search ............................ 33/504, 505, 600, 33/610; 702/33, 34, 35; 73/104, 105, 121; 188/1.11 R, 1.11 W, 18 A, 18 R

[56] References Cited

U.S. PATENT DOCUMENTS

| | | | |
|---|---|---|---|
| 1,891,185 | 12/1932 | Miller et al. | 33/180 AT |
| 2,545,784 | 3/1951 | Kenner | 248/230 |
| 3,359,642 | 12/1967 | Jesson et al. | 33/181 |
| 3,618,219 | 11/1971 | Kelly | 33/181 AT |
| 3,854,216 | 12/1974 | Mosher | 33/181 AT |
| 5,224,272 | 7/1993 | Toraason et al. | 33/504 |
| 5,239,486 | 8/1993 | Mortier | 364/551.01 |
| 5,469,629 | 11/1995 | Rogler | 33/831 |
| 5,485,678 | 1/1996 | Wagg et al. | 33/610 |
| 5,522,259 | 6/1996 | Schmidt et al. | 73/121 |
| 5,602,733 | 2/1997 | Rogers et al. | 364/424.034 |
| 5,705,744 | 1/1998 | Brugger et al. | 73/121 |
| 5,795,990 | 8/1998 | Gitis et al. | 73/9 |
| 5,848,672 | 12/1998 | Brearley et al. | 188/1.11 L |
| 5,870,835 | 2/1999 | Stieff | 33/600 |

*Primary Examiner*—Patrick Assouad
*Attorney, Agent, or Firm*—Michael J. Weins; Jeffrey E. Semprebon

[57] ABSTRACT

A brake testing device evaluates the condition of a disk having a disk axis and first and second disk surfaces that are normal to the disk axis. The device has a pair of gauges, each having a sensing element for measuring the position of one of the disk surfaces along a line parallel to the disk axis. The gauges generate position signals corresponding to the measured positions of the disk surfaces. The gauges are secured with respect to each other so as to measure positions along parallel lines, and the device positions the gauges to measure the disk surfaces at points equidistant from the disk axis. The gauges are preferably configured to allow testing a disk surrounded by a wheel and a dust shield. The device may be part of a system which processes the position signals to determine the thickness and the lateral run-out of the disk. The system may additionally compare the thickness and lateral runout to manufacturer-specified standards.

24 Claims, 9 Drawing Sheets

5,970,427

DISK BRAKE TESTING DEVICE AND SYSTEM EMPLOYING THE SAME

FIELD OF THE INVENTION

The present invention relates to testing disk brakes and more particularly to a brake testing device and related system for implementing the same which has the capacity to measure in situ parameters which assess the current condition of the disk of the disk brake.

BACKGROUND OF THE INVENTION

There are computer operated testing systems for many automotive systems. U.S. Pat. No. 5,485,678 discloses a system for testing the eccentricity of brake drums. However, no comparable system is available for the testing of disk brake rotors.

There have been a variety of gauges and tools developed over the years to test disk brakes by measuring the thickness and/or lateral run-out of disk brake rotors; however, these devices are frequently directed to a single task. U.S. Pat. No. 3,854,216 discloses a multi-function tool designed to measure both the lateral run-out and the thickness with a single gauge and bracket assembly. This assembly can be alternately positioned to provide measurements needed to determine the lateral disk run-out or the thickness, and is not well suited to an automated testing procedure, let alone being incorporated into a computer automated system.

U.S. Pat. No. 3,618,219 discloses a device which is functionally similar to that of the '216 patent, which is attached to the vehicle during testing. The device of the '219 patent is not well suited to an automated testing procedure and furthermore, as pointed out in the '216 patent, may result in inaccurate reading of the thickness due to lateral run-out.

Thus, there is a need for a device which is well suited for integration into a computer operated testing system which takes measurements that can be readily converted to values for the lateral run-out and the thickness of a brake disk.

OBJECTS OF THE INVENTION

It is an object of the present invention to provide a device which can simultaneously take measurements which can be transformed into lateral run-out and characterization of the thickness of a brake disk.

It is another object of the present invention to provide a device which can take measurements of brake disks while the disks and associated structure remain in situ on the vehicle.

It is another object of the present invention to provide a device which can take measurements of brake disks having dust shields which limit access to the brake disks.

It is another object of the present invention to provide a device which can take measurements and calculate values for the lateral run-out and characterization of the thickness of a brake disk.

It is another object of the present invention to provide a system for testing disk brakes which compares current values of lateral run-out and thickness to industry specified minimum requirements used in assessing how to maintain the brake disk.

It is another object of the present invention to provide a system for testing brake disks that employs a compact, handheld analysis unit which communicates with a monitoring unit which can be fixably positioned with respect to the vehicle.

It is another object of the present invention to provide a system for testing brake disks which employs a handheld analysis unit and a fixed monitoring unit which communicate via wireless communication ports.

It is another object of the present invention to provide a system for measuring brake disks which can provide a printout of the measured values and determine whether they are within previously-specified range of acceptable values.

It is another object of the present invention to provide a system for testing brake disks which can output test results to a customer records computer system of a vehicle maintenance facility.

SUMMARY OF THE INVENTION

The present invention is a device for testing disk brakes and a system employing the same.

The device of the present invention is designed to take in situ measurements for determining the present condition of a disk brake system of a vehicle while the disk and wheel remain on the vehicle. The device is designed for use with automobiles and other vehicles which employ disk brakes, each disk having a disk axis as well as a first disk surface and a second disk surface which are separated by a nominal thickness T, with the first disk surface and the second disk surface being substantially normal to the disk axis. The disk axis of each of the disks is in turn aligned with an associated wheel axis of the vehicle.

The brake testing device is provided with a first gauge having a first sensing element for determining variations of position of the first disk surface with respect to a line which is substantially parallel to the disk axis and substantially normal to the first disk surface. A second gauge is provided which has a second sensing element for determining variations of position of the second disk surface with respect to a line which is substantially parallel to the disk axis and substantially normal to the second disk surface.

The brake testing device includes means for generating position signals which correspond to the measured positions of the first disk surface and the second disk surface. Preferably, means for processing the position signals to determine the thickness and the lateral run-out of the disk are also provided to form a brake testing system which automatically provides values for the thickness and lateral runout.

The brake testing device also has means for securing the first gauge with respect to the second gauge such that the first sensing element and the second sensing element measure positions along lines which are substantially parallel.

It is preferred that the first and second sensing elements measure positions along a common line, since so measuring reduces the complexity of the calculations needed to process the position signals.

The brake testing device also has means for positioning and maintaining the first gauge and the second gauge with respect to the disk such that the first sensing element and the second sensing element measure positions at points which are substantially equidistant from the disk axis.

The brake testing device of the present invention may be implemented with a variety of gauges which can be broadly classed as contact and non-contact gauges. The use of non-contact gauges (e.g. electromagnetic field sensors, optical, and acoustical) generally provides greater precision in readings than contact gauges (e.g. linear displacement and rotational displacement). However, this increase in precision is generally obtained at the expense of simplicity and, when employed in an automotive shop environment, reliability.

The gauges used for the present invention may have incorporated therein means for generating a position signal which is appropriate for subsequent analysis of the displacement of the disk surfaces. If such means are not incorporated into the gauges and the gauges provide positions, these positions can be converted to position signals using converting devices (e.g. strain gauges, piezoelectric devices, magnetic coils with movable cores, optical encoders, and accelerometers).

The exact configuration of the gauges depends on the type of gauge employed and on the details of the brake system, as well as the wheel configuration.

For contact type gauges, each gauge has a gauge body which remains stationary, while the sensing element is movable with respect to the gauge body. A disk contacting surface on the sensing element engages one of the disk surfaces, and moves the sensing element in correspondence with axial motion of the disk surface as the disk is turned.

When the brake disk is tested in situ with the wheel in place, it is preferred that a transfer element be interposed between at least one of the gauge bodies and its associated sensing element to provide access to both sides of the disk from gauge bodies which are positioned on the same side of the disk. The difficulty in positioning the gauges increases when a dust shield is present, since such further reduces the free space for positioning the sensing elements. In such cases, it is frequently preferred to include a second transfer element.

It is further preferred to provide means for temporarily maintaining the separation between the disk contacting surfaces of the sensing elements at a separation S which is greater than the thickness T of the disk. Such means allow the gauges to be brought into position without interference with the disk.

For non-contact type gauges, each gauge has a sensing surface which serves as the sensing element and which is fixed with respect to the gauge body. The sensing surface is typically positioned in close proximity to one of the disk surfaces, and the gauge measures the distance between the sensing surface and the disk surface. When non-contact gauges are employed, the geometry of the gauges is preferably such that the brake testing device may be configured to allow placing the sensing surfaces in close proximity to their respective disk surfaces without requiring removal of the wheel or the dust shield.

For gauges which include signal generators as an integral part thereof, the signals are typically provided in analog signal form. While it is possible to directly process the analog position signals to obtain the desired information with regard to the thickness and lateral runout of the disk, it is preferred to convert the analog position signals to digital signals and to process these digital signals. For this reason, it is preferred to employ a means for processing the position signals which has an a/d converter for converting the position signals to provide digital signals. These digital signals can then be processed by a microprocessor provided with an instruction set to complete the means for processing the position signals to generate the desired output data. At least one output interface is provided to allow the user to access the output data.

To increase the flexibility of the brake testing device employing a microprocessor, it is preferred that at least one input interface be provided for the microprocessor. However, it is further preferred that the microprocessor be provided with at least two input interfaces, one of which is a key pad or other device for allowing the user to manually or otherwise directly input instructions and/or data, and the second being an electronic input interface such as a disk drive, card slot, or other device which will allow data to be electronically supplied to the microprocessor. This combination allows other instruction sets to be supplied to the microprocessor, increasing its flexibility, and allows the user to provide other instructional materials to the microprocessor.

Similarly, it is preferred that both a display screen and a data output port be provided. This combination allows the user to review to the output and to record the same for future reference or further processing.

It is further preferred that the microprocessor and related elements be housed in a case and that the case be attached to a support frame which serves as the means for securing the first gauge with respect to the second gauge such that the first sensing element and the second sensing element measure positions along lines which are substantially parallel. More preferably, the support frame is configured such that the first and second sensing elements measure positions along a common line.

In one preferred embodiment which employs a support frame which secures the first gauge with respect to the second gauge, the means for positioning and maintaining the first sensing element and the second sensing element with respect to the disk is a flexible fixable member. The flexible fixable member is removably attachable to the vehicle for which the brakes are being tested, and terminates in a frame attaching end, which is affixed to the support frame, and a clampable end, which can be removably attached to the vehicle being tested.

It is further preferred that one of the above described embodiments be part of a system which not only can monitor the state of wear of a disk, but can provide an analysis of the condition of the disk compared manufacturer-specified standards. A system with such capacity needs the ability not only to input the manufacturer's standards, but also an instruction set for analyzing the data with respect to such standards.

While all of the functions needed for such a system can be supplied with a single microprocessor housed in a single case if adequate memory is provided for storage of the manufacturer's standards, such configuration is not preferred. For operational reasons, it is advantageous to separate the analysis component from disk monitoring aspect of the system. This reduces the size of the in situ unit and allows the data to be analyzed at a remote location where it is more convenient to download information from the manufacturer and to program and operate the microprocessor. To provide such a system, the analysis, programming, inputting of data or instruction sets is performed by a second microprocessor housed in a second case.

It is further preferred that, when two microprocessors are employed, that the first microprocessor which is on board the brake testing device have a first microprocessor communication port which communicates with a second microprocessor communication port of the second microprocessor, so as to allow the transfer of information between the two microprocessors. It is further preferred that these ports be infrared ports or radio frequency ports so that no physical connection is required.

BEST MODE OF CARRYING THE INVENTION INTO PRACTICE

Figure 1:
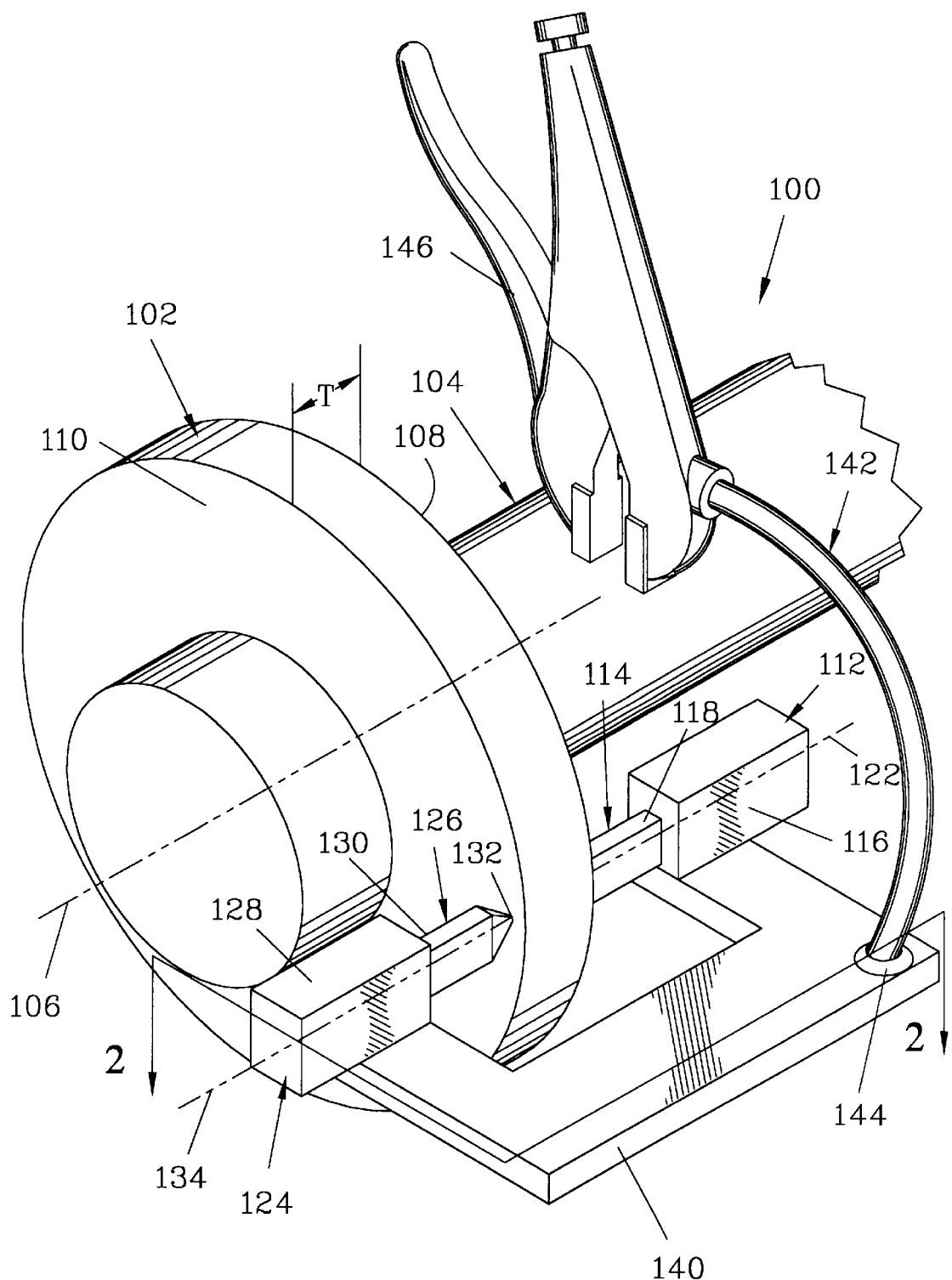
FIG. 1 is an isometric view of one embodiment of a brake testing device of the present invention. This embodiment employs a pair of contact gauges to measure variations in position of the surfaces of a brake disk. These contact gauges are linear contact gauges which have sensing elements for monitoring the position of the disk surfaces along a line which is parallel to the disk axis. The linear contact gauges are maintained in a fixed position with respect to the disk by a frame attached to a fixable, adjustable coupling which in turn is attached to a clamp which can be affixed to the vehicle on which the disk is mounted.

FIG. 1 is an isometric view illustrating a brake testing device 100 which forms one embodiment of the present invention. The brake testing device 100 is employed to take measurements of a brake disk 102 of a wheel mounting assembly 104 of a vehicle (not shown). The disk 102 is mounted so as to be rotatable about a disk axis 106. The disk 102 has a first disk surface 108 and a second disk surface 110, which are substantially normal to the disk axis 106 and are separated by a nominal disk thickness T.

The brake testing device 100 has a first gauge 112 having a first sensing element 114. In this embodiment, the first gauge 112 is a linear contact gauge having a first gauge body 116 which is maintained in a fixed position relative to the disk axis 106. The first sensing element 114 of this embodiment is a first slider which is slidably and resiliently mounted to the first gauge body 116. The first sensing element 114 has a first sensing element body-engaging end 118, which slidably engages the first gauge body 116, and a first disk contacting surface 120 (shown in FIGS. 2 and 3). The resilient mounting of the first sensing element 114 to the first gauge body 116 maintains the first disk contacting surface 120 in contact with the first disk surface 108. The first gauge body 116 is positioned such that the first sensing element 114 moves along a first path 122 which is substantially parallel to the disk axis 106, following motion of the first disk surface 108 with respect to the first path 122 as the disk 102 is turned.

The first gauge 112 includes means for generating position signals proportional to the position of the first disk contacting surface 120. This means may be provided by measuring the position or, alternatively, by measuring a derivative of the position as a function of time. For example, the relative motion between the first sensing element 114 and the first gauge body 116 could be measured and position signals generated which correspond to such motion. Similarly, the acceleration of the sensing element 114 could be measured, and the position obtained from the acceleration.

The position or derivative of the position may be measured by any of a variety of devices known in the art for generating signals responsive to variation in the position or derivative of the position between two elements. Such devices include direct-contact type devices, such as physical strain gauges or piezoelectric devices, and non-contact type devices, such as electromagnetic field responsive sensors or optical distance gauges. For example, if the first gauge body 116 incorporates a capacitance sensor, the first sensing element body-engaging end 118 of the first sensing element 114 is configured to produce a measurable change in capacitance as it slides relative to the first gauge body 116. One supplier of gauges which use capacitance measurements to generate position signals is LS Starrett of Athol, Mass. Generated signals which are proportional to the measured capacitance thus correspond to the position of the first sensing element 114, which in turn corresponds to the position of the first disk surface 108.

Similarly, the brake testing device 100 has a second gauge 124 having a second sensing element 126. The second gauge 124 is a linear contact gauge having a second gauge body 128, and the second sensing element 126 is a second slider which slidably and resiliently engages the second gauge body 128. The second sensing element 126 has a second sensing element body-engaging end 130, which slidably engages the second gauge body 128, and a second disk contacting surface 132. The resilient mounting of the second sensing element 126 in the second gauge body 128 maintains the second disk contacting surface 132 in contact with the second disk surface 110. The second gauge body 128 is positioned with respect to the disk 102 such that the second sensing element 126 moves along a second path 134 which is substantially parallel to the disk axis 106, following motion of the second disk surface 110 with respect to the second path 134 as the disk 102 is turned.

The second gauge 124 includes means for generating position signals which correspond to the measured position of the second disk surface 110. These position signals can be generated from direct measurement of the position, or from derivatives of position with respect to time as discussed above.

Means for securing the first gauge 112 with respect to the second gauge 124 such that the first sensing element 114 and the second sensing element 126 measure positions along lines which are substantially parallel are provided. In the brake testing device 100, such means are provided by a support frame 140, to which both the first gauge body 116 and the second gauge body 128 are affixed. The first gauge body 116 and the second gauge body 128 are mounted to the support frame 140 such that the first path 122 and the second path 134 are substantially parallel. The support frame 140 is preferably configured such that the first path 122 and the second path 134 are coincident. In the brake testing device 100, the support frame 140 is configured to position the first gauge 112 and the second gauge 124 on either side of the disk 102. The first disk contacting surface 120 and the second disk contacting surface 132 are separated by a separation S, as shown in FIG. 2.

Means for positioning and maintaining the first gauge 112 and the second gauge 124 with respect to the disk 102 such that the first sensing element 114 and the second sensing element 126 measure positions along lines which are substantially equidistant from the disk axis 106 and are substantially parallel to the disk axis 106 are also provided. In the brake testing device 100, such means are provided by a flexible fixable member 142. The flexible fixable member 142 terminates in a frame attaching end 144, which is attached to the support frame 140, and a clamping end 146, which may be readily secured to part of the vehicle. Such flexible fixable members are commercially available, such as the Flexbar® device marketed by Flexbar Machine Corporation. When the clamping end 146 is secured to the vehicle, the flexible fixable member 142 may be adjusted to position the support frame 140 relative to the vehicle and the disk 102.

It should be noted that configuring the support frame 140 such that the first path 122 and the second path 134 are coincident assures that the paths (122 and 134) are substantially equidistant from the disk axis 106 when the support frame 140 is positioned such that the first path 122 and the second path 134 are substantially parallel to the disk axis 106.

Figure 2:
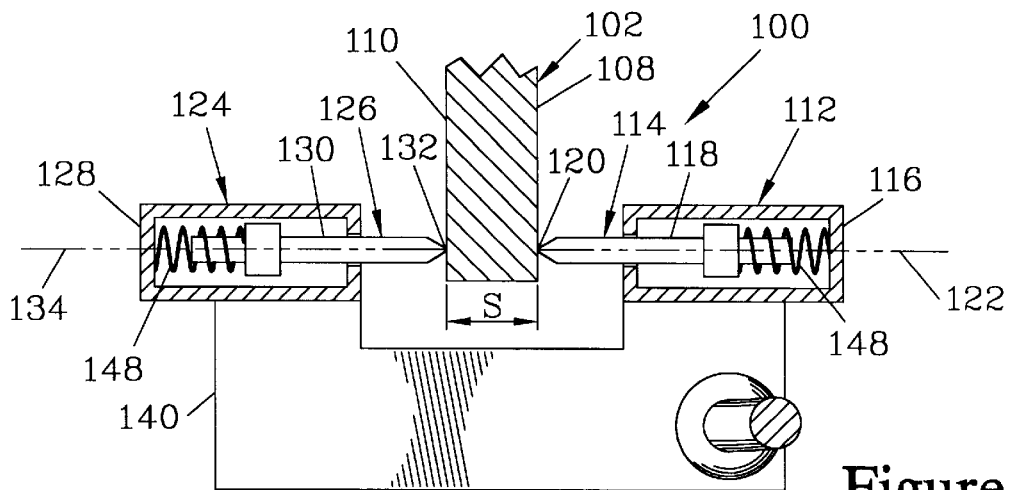
FIG. 2 is a view of the section 2—2 of FIG. 1 and shows springs employed to bias the sensing elements of the gauges towards the disk to maintain them in contact with the disk surfaces.

FIG. 2 is a partial section view showing the brake testing device 100 when the support frame 140 is positioned such that the disk 102 resides between the first gauge 112 and the second gauge 124. The first sensing element 114 and the second sensing element 126 are biassed into contact with the disk 102 by springs 148. As the disk 102 is manually rotated relative to the brake testing device 100, the first sensing element 114 moves along the first path 122 as the first disk surface 108 rotates, changing the position of the first disk surface 108 as measured along the first path 122. Similarly, the second sensing element 126 moves along the second path 134 as the position of the second disk surface 110 changes.

After a complete rotation of the disk 102 relative to the brake testing device 100, the lateral run-out of the disk 102 may be calculated by subtracting the minimum position measured from the maximum position measured by either the first gauge 112 or the second gauge 124. Preferably, the lateral run-out values from both the first and second gauges (112 and 124) are averaged.

Figure 3:
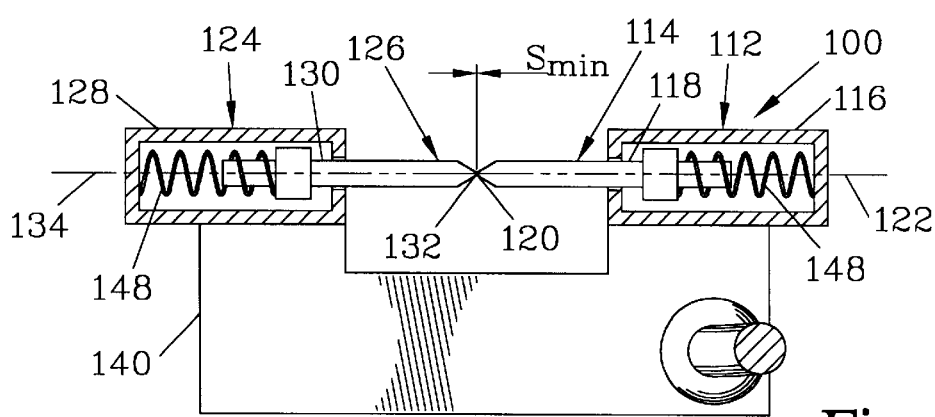
FIG. 3 is a view of the section 2—2 where the disk has been removed. Disk contacting surfaces of the sensing elements are at a minimal separation $S_{min}$ which is less than the minimum thickness T of the disk.

FIG. 3 is a view which corresponds to that of FIG. 2, but where the support frame 140 is positioned away from the disk 102. In this position, one of the springs 148 moves the first sensing element 114 to a first sensing element rest position where the first disk contacting surface 120 is at a maximum separation from the first gauge body 116. Similarly, the other spring 148 moves the second sensing element 126 to a second sensing element rest position where the second disk contacting surface 132 is at a maximum separation from the second gauge body 128. At these positions, the first disk contacting surface 120 and the second disk contacting surface 132 are separated by a minimum separation $S_{min}$.

Typically, the brake testing device 100 is configured such that the first disk contacting surface 120 of the first sensing element 114 and the second disk contacting surface 132 of the second sensing element 126 are biassed into contact with each other, making the minimum separation $S_{min}$ equal to zero. At their rest positions, the first disk contacting surface 120 and the second disk contacting surface 132 are maintained in contact with each other and at equilibrium by the springs 148.

To calculate the instantaneous thickness of the disk 102, the positions of both the first sensing element 114 and the second sensing element 126 are measured relative to their respective rest positions, which are shown in FIG. 3.

The difference between the instantaneous positions of the first sensing element 114 and the second sensing element 126 relative to their respective rest positions, added together and added to the minimum separation $S_{min}$, gives an instantaneous value for the separation S between the first disk contacting surface 120 and the second disk contacting surface 132. When the disk contacting surfaces (120 and 132) are biassed into contact with the disk 102, this separation S is equal to the instantaneous thickness of the disk 102.

To obtain an average thickness value, a number of instantaneous thickness values calculated from measurements taken as the disk 102 is rotated relative to the disk testing device 100 may be averaged. Alternatively, the sums of a number of instantaneous positions of the first sensing element 114 and of the second sensing element 126 may be averaged, and added to the minimum separation $S_{min}$ to obtain a value for the average thickness of the disk 102.

When the sensitivity of the first gauge 112 and the second gauge 124 is sufficient, the thickness variation can be obtained by taking the difference between the minimum instantaneous thickness value and the maximum instantaneous thickness value.

Figure 4:
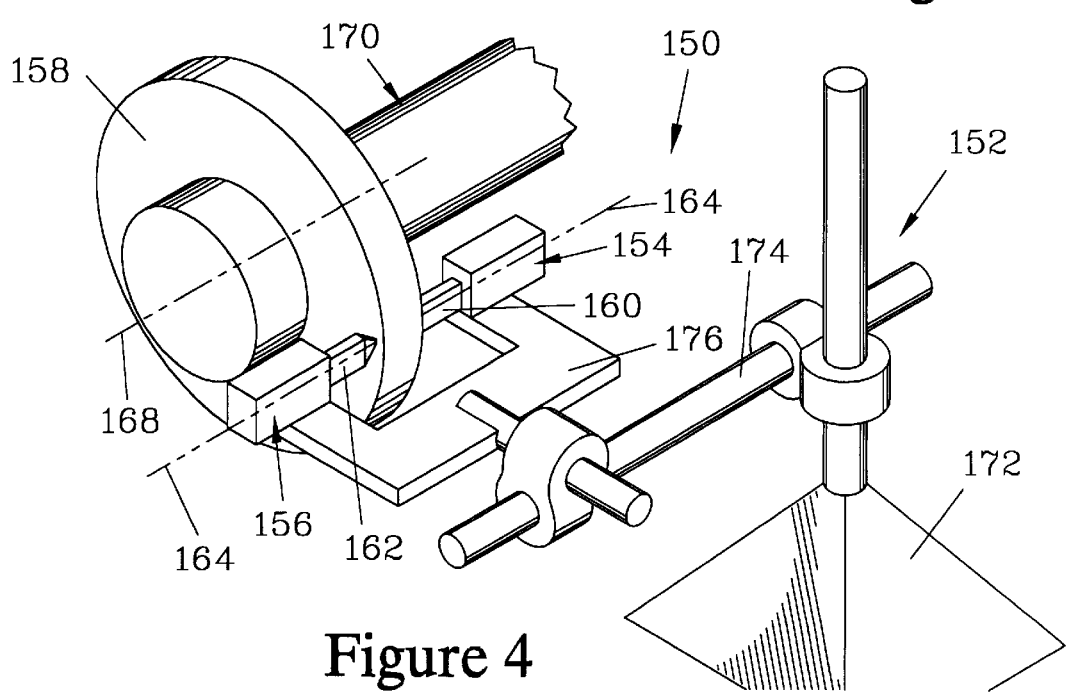
FIG. 4 is an isometric view of another embodiment of the present invention which has the same gauge configuration as the embodiment of FIG. 1. This embodiment differs in that the frame is supported by a floor stand rather than by a coupling attaching to the vehicle.

FIG. 4 illustrates a brake testing device 150 which forms another embodiment of the present invention, and shares many features in common with the brake testing device 100 discussed above. However, the brake testing device 150 has an adjustable floor stand 152 which provides means for positioning and maintaining a first gauge 154 and a second gauge 156 with respect to a disk 158 such that a first sensing element 160 and a second sensing element 162 measure positions along lines 164 which are equidistant from a disk axis 168 and are substantially parallel to the disk axis 168. The adjustable floor stand 152 rests on a surface which is stationary relative to a wheel mounting assembly 170 of a vehicle (not shown), to which the disk 158 is mounted. The adjustable floor stand 152 has a stand portion 172, which rests on the surface, and an adjustable arm 174. The adjustable arm 174 allows positioning a support frame 176 relative to the disk 158, and the first gauge 154 and the second gauge 156 are mounted to the support frame 176.

While the brake testing devices (100 and 150) discussed above are well suited for testing vehicle brake disks to determine thickness and lateral runout of the disk, these devices (100 and 150) require the wheel to be removed to provide access to the disk. Additionally, if the disk is protected by a dust shield, the dust shield must also be removed. To facilitate brake testing, it is desirable to allow testing the brake disk while the wheel and dust shield remain in place.

Figure 5:
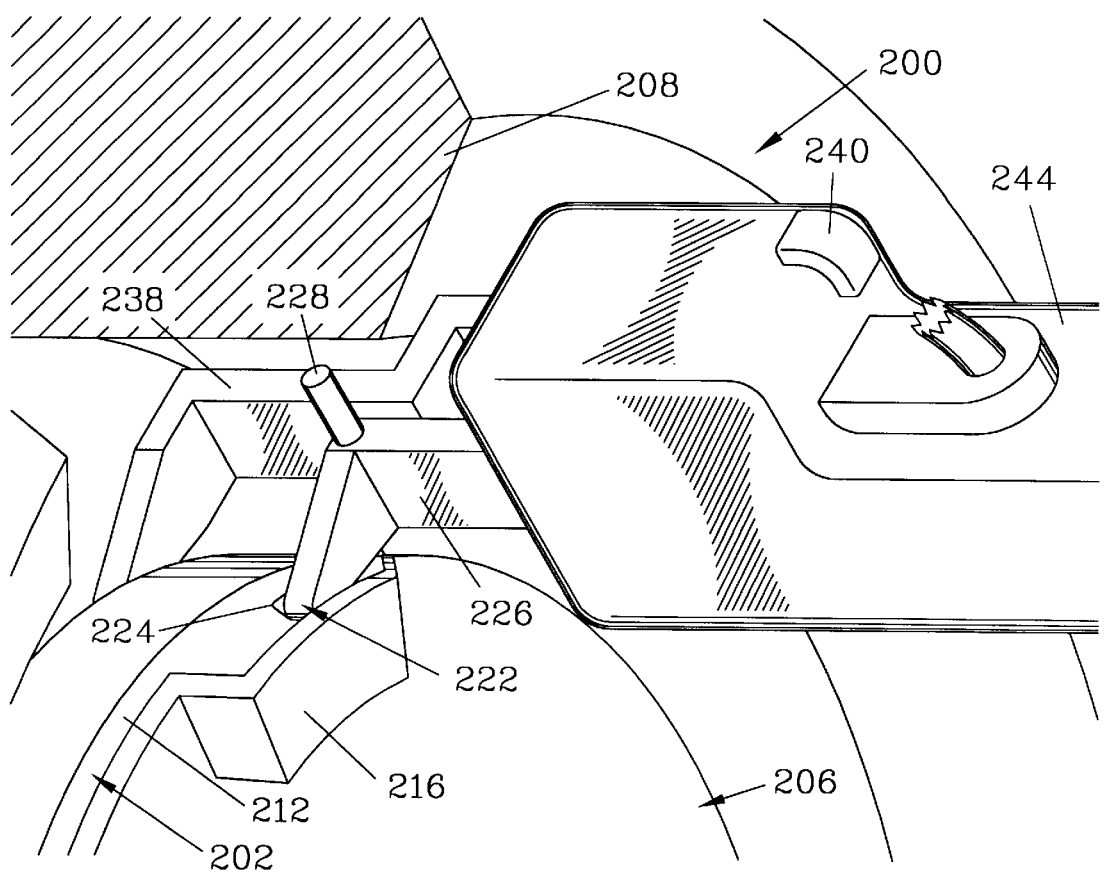
FIG. 5 is an isometric view of another embodiment of the present invention which also employs linear contact gauges. This embodiment differs from the embodiment of FIGS. 1–3 in that the gauges are provided with transfer elements configured to allow testing a disk having a dust shield and without requiring removal of the wheel associated with the disk. The device also has means for temporarily maintaining the disk contacting surfaces of the sensing elements at a separation S greater than the thickness T of the disk to allow positioning the sensing elements such that the disk resides between the disk contacting surfaces.
Figure 6:
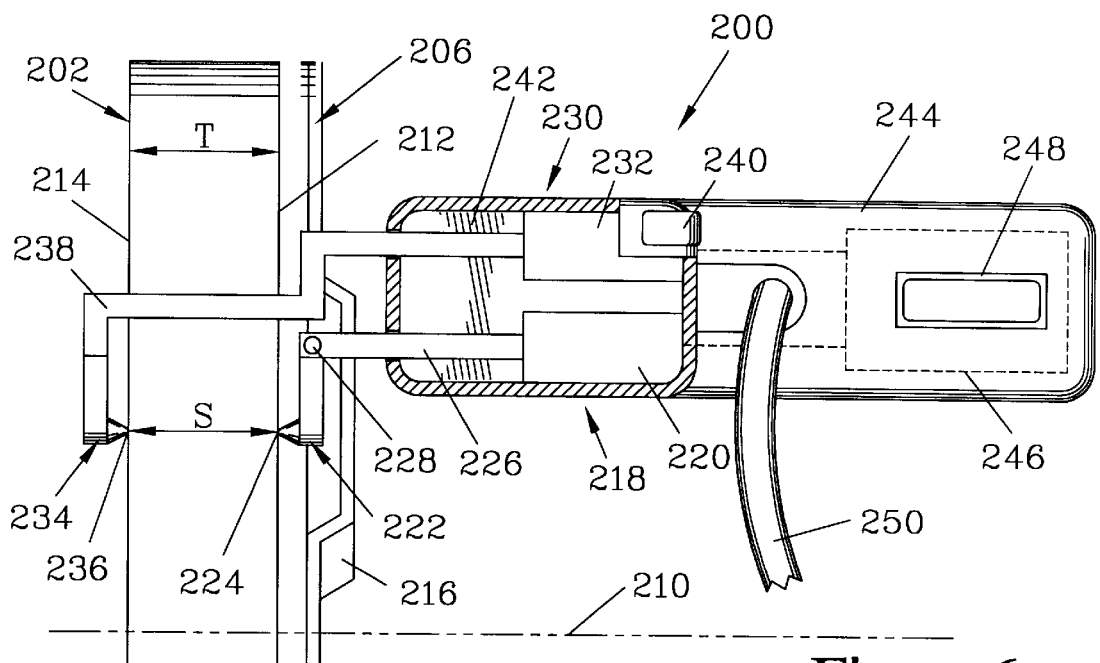
FIG. 6 is a partial view of the embodiment of FIG. 5 showing further details of the transfer elements.

FIGS. 5 and 6 illustrate a brake testing device 200 which is configured to test a brake disk 202 of a vehicle (not shown), where access to the disk 202 is limited by a dust shield 206 and a wheel 208. The disk 202 again has a disk axis 210, a first disk surface 212, and a second disk surface 214. The dust shield 206 is provided with an access blister 216 to allow measuring the thickness of the disk 202 with a standard micrometer after removal of the wheel 208.

As best shown in FIG. 6, the brake testing device 200 has a first gauge 218 which is a linear contact gauge. The first gauge 218 has a first gauge body 220 and a first sensing element 222 which is resiliently slidable with respect to the first gauge body 220. The first sensing element 222 has a first disk contacting surface 224 which resiliently engages the first disk surface 212 of the disk 202.

The first sensing element 222 of this embodiment is mounted to a first transfer element 226 which is interposed between the first sensing element 222 and the first gauge body 220. The first transfer element 226 resiliently slidably engages the first gauge body 220, and is configured to position the first disk contacting surface 224 under the access blister 216 of the dust shield 206, allowing the first disk contacting surface 224 to engage the first disk surface 212 at a point which is covered by the dust shield 206. The first sensing element 222 is sized to assure that the first disk contacting surface 224 may be inserted under the access blister 216 and is free to move as the position of the first disk surface 212 changes.

To facilitate placing the first disk contacting surface 224 against the first disk surface 212 under the access blister 216, the first transfer element 226 is provided with a retraction post 228. The retraction post 228 allows the user to manually move the first transfer element 226 against its bias to position the first disk contacting surface 224 between the disk 202 and the dust shield 206.

Again, the first gauge 218 measures the relative position of the first sensing element 222 with respect to the first gauge body 220 and is provided with means for generating position signals corresponding to the relative position. This means thus provides position signals which correlate to the position of the first disk surface 212.

The brake testing device 200 has a second gauge 230, which is a linear contact gauge having a second gauge body 232. In this embodiment, the second gauge body 232 resides on the same side of the disk 202 as does the first gauge body 220 of the first gauge 218. A second sensing element 234 is slidably and resiliently mounted with respect to the second gauge body 232. The second sensing element 234 has a second disk contacting surface 236. Since the second gauge body 232 resides on the same side of the disk 202 as the first gauge body 220, the second sensing element 234 is biased to move toward the second gauge body 232 to maintain the second disk contacting surface 236 in contact with the second disk surface 214.

The second sensing element 234 is mounted to a second transfer element 238, which is interposed between the second sensing element 234 and the second gauge body 232 and is configured to pass between the disk 202 and the wheel 208 in order to position the second disk contacting surface 236 in contact with the second disk surface 214. The dimensional limitations of the second transfer element 238 and the second sensing element 234 to allow the second sensing element 234 to be passed between the disk 202 and the wheel 208 are similar to the anvil dimensions discussed in detail in U.S. Pat. No. 5,469,629.

To facilitate inserting the second disk contacting surface 236 between the disk 202 and the wheel 208, a second sensing element lock 240 is provided. When activated, the second sensing element lock 240 prevents relative motion between the second transfer element 238 and the second gauge body 232. In combination, the retraction post 228 on the first transfer element 226 and the second sensing element lock 240 provide means for maintaining the first disk contacting surface 224 and the second disk contacting surface 236 at a separation S which is greater than the nominal disk thickness T of the disk 202.

To position the second disk contacting surface 236, the user manually extends the second transfer element 238 against its bias, at which point it is locked in such extended position by activating the second sensing element lock 240. The second disk contacting surface 236 is passed between the disk 202 and the wheel 208 and, while the user manually adjusts the position of the first disk contacting surface 224 of the first sensing element 222 by use of the retraction post 228 on the first transfer element 226, the second disk contacting surface 236 and the first disk contacting surface 224 are inserted into position to respectively engage the second disk surface 214 and the first disk surface 212. The second sensing element lock 240 is then deactivated, and the second disk contacting surface 236 is biased to resiliently engage the second disk surface 214.

The second gauge 230 again measures the relative position between the second sensing element 234 and the second gauge body 232 and generates signals proportional to the relative position, thus providing means for generating position signals which correspond to the position of the second disk surface 214. Because the second gauge body 232 resides on the same side of the disk 202 as the first gauge body 220, the motion of the second sensing element 234 relative to the second gauge body 232 in response to displacement of the second disk surface 214 is the reverse of the motion of the first sensing element 222 relative to the first gauge body 220 in response to displacement of the first disk surface 212.

The brake testing device 200 has a support frame 242, to which both the first gauge body 220 and the second gauge body 232 are fixably mounted to provide means for securing the first gauge 218 with respect to the second gauge 230 such that the first sensing element 222 and the second sensing element 234 measure positions along lines which are substantially parallel. The support frame 242 of this embodiment is further configured such that the first sensing element 222 and the second sensing element 234 measure positions along a common line.

In this embodiment, a case 244 is attached to the support frame 242. To provide a brake testing system which automatically provides values for the thickness and lateral runout of the disk 202, the brake testing device 200 may be provided with means for processing the position signals to determine the thickness and lateral runout 246, as well as a display 248 to provide the calculated values to the user. The means 246 and display 248 are housed in the case 244, which may also contain batteries to provide a source of power for the first gauge 218, the second gauge 230, the means 246, and the display 248.

Figure 15:
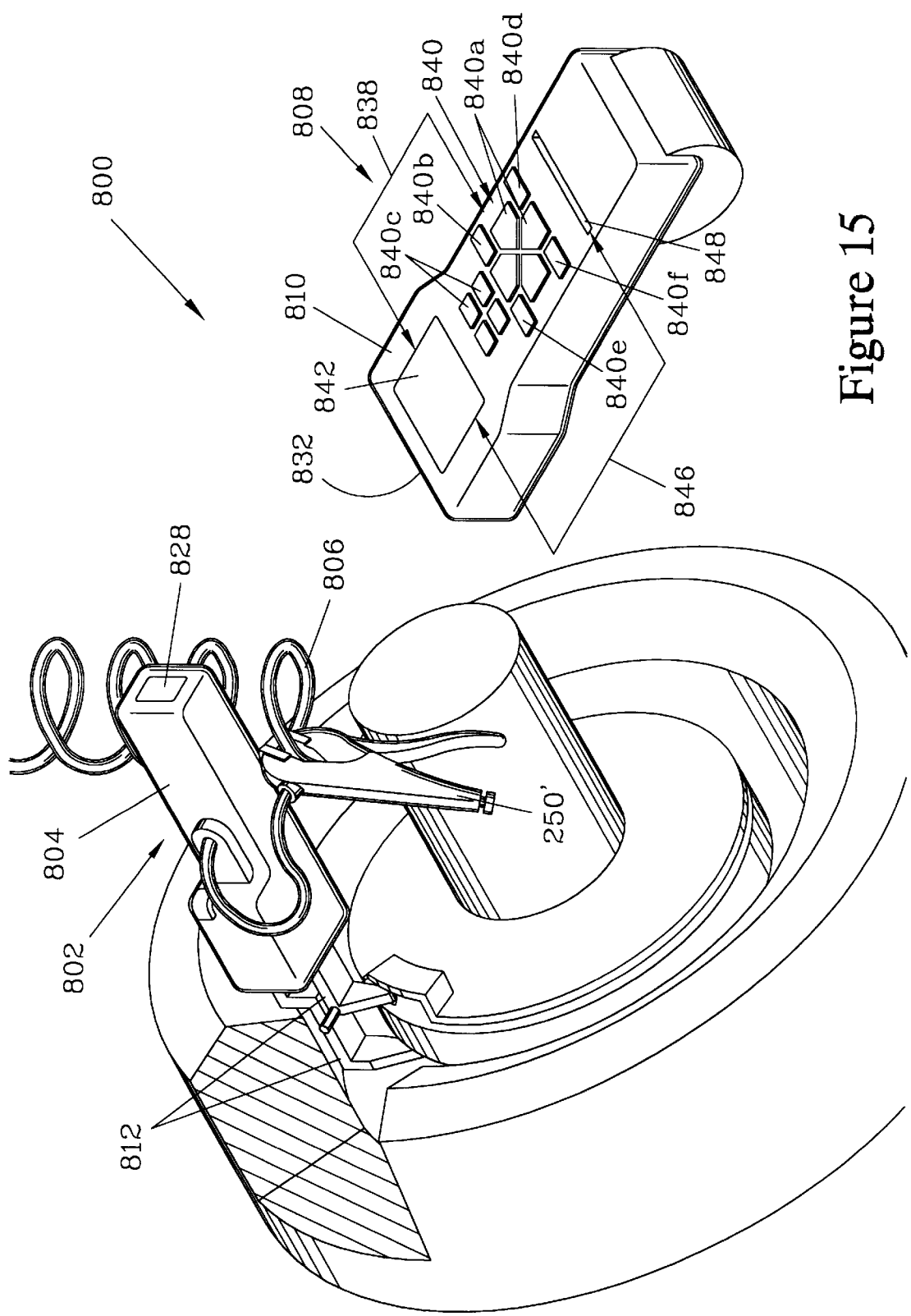
FIG. 15 is an isometric view of another embodiment of the present invention which provides a comparative analysis of the disk condition. This embodiment employs two microprocessors. The first microprocessor is a monitoring microprocessor, which calculates the lateral run-out and the disk thickness. The second microprocessor is an analyzing microprocessor which compares the calculated values to specified standards. The gauges, monitoring microprocessor, and associated elements are housed in a first case positioned near the disk, while the analyzing microprocessor and associated elements are housed in a second case which may be conveniently held by the user to operate the system. Wireless communication ports allow the monitoring microprocessor and the analyzing microprocessor to communicate with each other.

The support frame 242 is adjustably positioned by an flexible fixable member 250, which is similar to the flexible fixable member 142 shown in FIG. 1 (and is further illustrated in FIG. 15 as 250'). Again, the flexible fixable member 250 provides means for positioning and maintaining the first gauge 218 and the second gauge 230 with respect to the disk 202 such that the first sensing element 222 and the second sensing element 234 measure positions along lines which are equidistant from the disk axis 210 and are substantially parallel to the disk axis 210.

Figure 7:
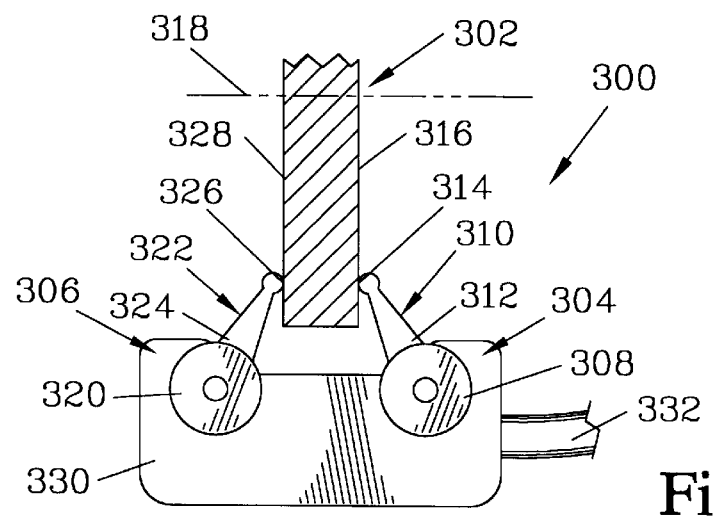
FIG. 7 is a view illustrating another embodiment of the present invention, which employs rotary contact gauges having sensing elements which are pivoting arms.

While the embodiments discussed above employ linear contact gauges, alternative contact-type gauges may be employed. FIG. 7 is a schematic view of a brake testing device 300 for testing a brake disk 302. The brake testing device 300 shares many features in common with the brake testing device 100 shown in FIGS. 1–3; however, the brake testing device 300 has a first gauge 304 and a second gauge 306 which are both rotary contact gauges.

The first gauge 304 has a first gauge body 308 and a first sensing element 310, which in this embodiment is a first pivot arm that is rotatably and resiliently mounted to the first gauge body 308. The first sensing element 310 terminates in a first sensing element body-engaging end 312, which rotatably engages the first gauge body 308, and a first disk contacting surface 314, resiliently engaging a first disk surface 316 of the disk 302. Since the displacement of the first disk contacting surface 314 is small as the disk 302 rotates, the first disk contacting surface 314 moves in a direction substantially parallel to a disk axis 318.

The first gauge 304 measures the relative angular movement between the first sensing element 310 and the first gauge body 308 and contains means for generating position signals corresponding to such movement. These position signals correspond to the measured position of the first disk surface 316. The proportion of motion of the first sensing element body-engaging end 312 relative to the first gauge body 308 with respect to motion of the first disk surface 316 is dependent on the geometry of the first sensing element 310, and the measurement of such relative motion must be scaled accordingly to provide the actual position measurement.

Similarly, the second gauge 306 has a second gauge body 320, to which is rotatably and resiliently mounted a second sensing element 322, which in this embodiment is a second pivot arm. The second sensing element 322 terminates in a second sensing element body-engaging end 324, which rotatably engages the second gauge body 320, and a second disk contacting surface 326, which resiliently engages a second disk surface 328 of the disk 302. Again, since the displacement of the second disk contacting surface 326 is small as the disk 302 is rotated, the second disk contacting surface 326 moves in a direction substantially parallel to the disk axis 318.

The second gauge 306 measures the relative motion between the second sensing element 322 and the second gauge body 320 and contains means for generating position signals corresponding to such movement. These position signals correspond to the measured position of the second disk surface 328. Again, the measurement of the relative motion between the second sensing element 322 and the second gauge body 320 must be appropriately scaled to provide the actual position measurement for the second disk surface 328.

The brake testing device 300 has a support frame 330, to which both the first gauge body 308 and the second gauge body 320 are affixed, and a flexible fixable member 332 (only partially shown) which allows adjustably positioning the support frame 330.

Figure 8:
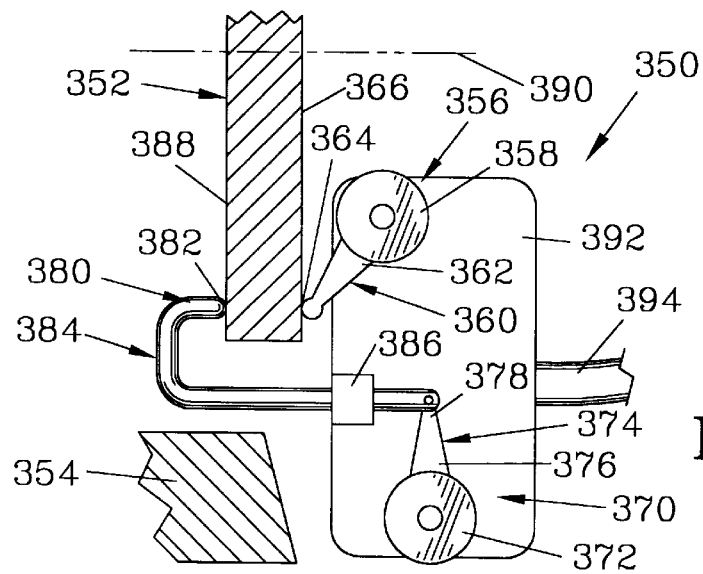
FIG. 8 illustrates another embodiment of the present invention, which employs a combination of translational and rotary motion to monitor the surfaces of a brake disk. In this embodiment a pair of rotary contact gauges are employed. One of the sensing elements is a pivot arm of one of the rotary contact gauges, while the other sensing element is connected to a transfer element that in turn is connected to the pivot arm of the second gauge. This embodiment allows testing a disk without removal of the wheel for wheel mountings where there is no dust shield.

FIG. 8 is a schematic view of a brake testing device 350 which shares many features in common with the brake testing device 300 shown in FIG. 7, but which allows testing of a brake disk 352 when access to the brake disk 352 is restricted by a wheel 354. The brake testing device 350 employs a combination of rotational and translational motion to monitor the surfaces of the brake disk 352.

The brake testing device 350 has a first gauge 356 which is a rotary contact gauge having a first gauge body 358 and a first sensing element 360 which is a pivot arm. The first sensing element 360 has a first sensing element body-engaging portion 362, which rotatably engages the first gauge body 358, and a first disk contacting surface 364, which resiliently engages a first disk surface 366 of the disk 352.

A second gauge 370 is provided, which is a rotary contact gauge having a second gauge body 372 and a second pivot arm 374. The second pivot arm 374 has a second pivot arm body-engaging portion 376, which rotatably engages the second gauge body 372, and a second pivot arm connector portion 378.

In this embodiment, a second sensing element 380 is resiliently slidable with respect to the second gauge body 372. A second disk contacting surface 382 is provided on the second sensing element 380, which in turn is mounted to a transfer element 384. The transfer element 384 slidably engages a bracket 386 and is rotatably engaged with the second pivot arm connector portion 378. Additionally, a small degree of translational freedom between the transfer element 384 and the second pivot arm connector portion 378 may be provided to prevent binding. The connection of the transfer element 384 to the second pivot arm connector portion 378 provides a resilient engagement of the second disk contacting surface 382 with a second disk surface 388 of the disk 352 while the slidable engagement of the transfer element 384 with the bracket 386 assures that the second disk contacting surface 382 moves in a direction substantially parallel to a disk axis 390 as the second disk surface 388 is displaced in such direction. The transfer element 384 allows inserting the second sensing element 380 between the disk 352 and the wheel 354 to place the second disk contacting surface 382 against the second disk surface 388.

The bracket 386 is affixed to a support frame 392, which in turn is mounted to a flexible fixable member 394 (only partially shown) which adjustably positions the support frame 392, the first gauge 356, and the second gauge 370 with respect to the disk 352.

Figure 9:
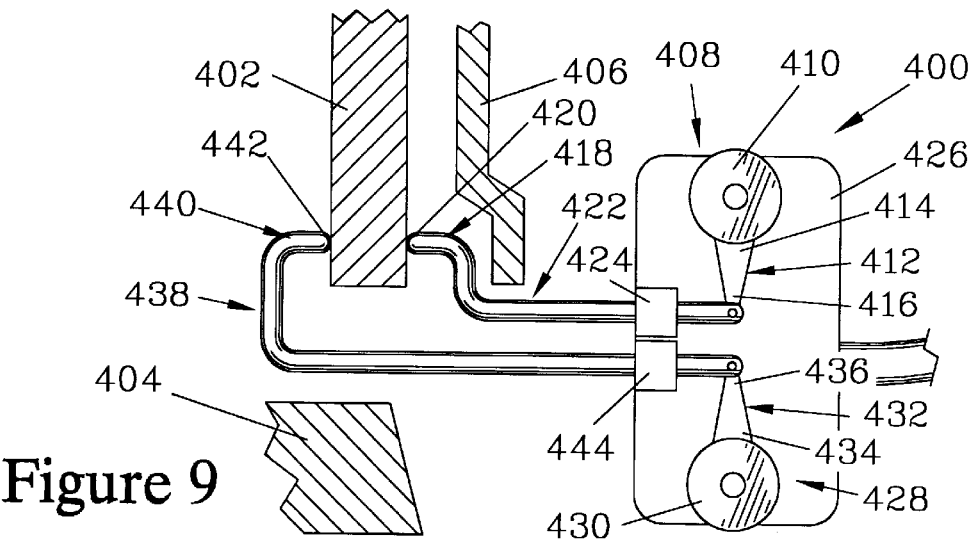
FIG. 9 illustrates another embodiment which employs rotary contact gauges which are coupled to sensing elements by transfer elements having linear movements. The transfer elements are connected to pivot arms of the rotary contact gauges. This embodiment allows testing a disk without removal of the dust shield or the wheel.

FIG. 9 is a schematic view of a brake testing device 400 which allows testing of a brake disk 402 when access to the brake disk 402 is restricted by a wheel 404 as well as a dust shield 406.

The brake testing device 400 has a first gauge 408 which is a rotary contact gauge having a first gauge body 410 and a first pivot arm 412. The first pivot arm 412 of this embodiment terminates in a first pivot arm body-engaging portion 414, which rotatably engages the first gauge body 410, and a first pivot arm connector portion 416.

A first sensing element 418 having a first disk contacting surface 420 is mounted to a first transfer element 422, which is pivotably connected to the first pivot arm connector portion 416 and which slidably engages a first bracket 424 on a support frame 426. Again, the connection between the first transfer element 422 and the first pivot arm connector portion 416 must be a non-binding connection. The first transfer element 422 is configured to allow inserting the first sensing element 418 behind the dust shield 406.

Similarly, a second gauge 428 which is a rotary contact gauge has a second gauge body 430 and a second pivot arm 432. The second pivot arm 432 has a second pivot arm body-engaging portion 434 and a second pivot arm connector portion 436. The second pivot arm connector portion 436 is pivotably engaged with a second transfer element 438, to which is mounted a second sensing element 440 which terminates in a second disk contacting surface 442. The second transfer element 438 slidably engages a second bracket 444 on the support frame 426. The second transfer element 438 is configured to allow inserting the second sensing element 440 between the disk 402 and the wheel 404.

While the brake testing devices discussed above use contact-type gauges which are relatively inexpensive and reliable, in certain circumstances it may be desirable to use non-contact type distance gauges. Such gauges typically provide measurements to a greater degree of accuracy than is available with contact-type gauges and may allow the variation of the thickness of the disk to be measured.

Figure 10:
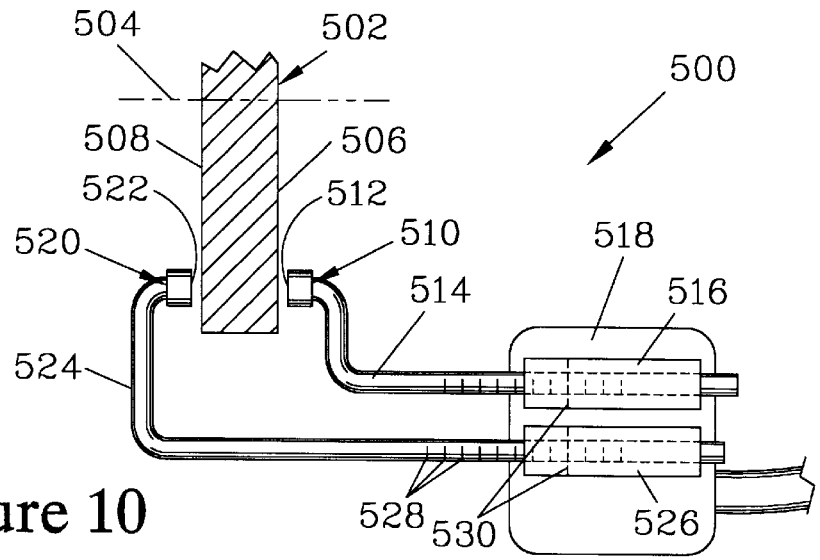
FIG. 10 illustrates another embodiment of the present invention, which employs non-contact gauges. This embodiment employs electromagnetic field sensors as gauges, the electromagnetic field sensors have sensing surfaces which serve as sensing elements. The small size of the gauges allows them to be positioned in close proximity to the disk surfaces to monitor the disk when access is limited by the dust shield and the wheel.

FIG. 10 is a schematic view of a brake testing device 500 for testing a brake disk 502 using non-contact type distance gauges. The disk 502 has a disk axis 504, a first disk surface 506, and a second disk surface 508.

The brake testing device 500 has a first gauge 510 which is an electromagnetic field sensor type distance gauge. The first gauge 510 may be any of the various electromagnetic field sensors known in the art, such as magnetic or capacitance sensors, and has a first sensing surface 512 which, in this embodiment, serves as a first sensing element. The first sensing surface 512 is a radiating surface of the first gauge 510 from which an electromagnetic field is emitted. The first sensing surface 512 is positioned near the first disk surface 506, and the first gauge 510 uses one or more parameters of the emitted electromagnetic field to measure the distance of the first sensing surface 512 from the first disk surface 506.

The first gauge 510 is mounted to a first mounting arm 514 which in turn is mounted to a first mounting base 516. The first mounting base 516 is affixed to an adjustably positionable support frame 518. The first mounting arm 514 can be adjustably positioned with respect to the first mounting base 516 to allow the first sensing surface 512 of the first gauge 510 to be positioned in close proximity to the first disk surface 506.

The first gauge 510 includes means for generating position signals that correlate to the distance between the first sensing surface 512 and the first disk surface 506, thus providing the relative position of the first disk surface 506 with respect to the first sensing surface 512 as measured in a direction parallel with the disk axis 504. In the brake testing device 500, the signals are correlated directly to the position of the first disk surface 506 with respect to the first sensing surface 512.

Similarly, the brake testing device 500 has a second gauge 520 having a second sensing surface 522 which serves as a second sensing element. The second gauge 520 is mounted to a second mounting arm 524 which in turn is adjustably mounted to a second mounting base 526 affixed to the support frame 518. The second mounting arm 524 and the second mounting base 526 allow the second sensing surface 522 to be positioned in close proximity to the second disk surface 508.

The second gauge 520 includes means for generating position signals that correlate to the distance between the second sensing surface 522 and the second disk surface 508 as measured in a direction parallel with the disk axis 504, these signals corresponding to the position of the second disk surface 508. Again, in the brake testing device 500, the signals are correlated directly to the position of the second disk surface 508 with respect to the second sensing surface 522.

While the positions measured by the first gauge 510 and the second gauge 520 may be used directly to calculate lateral run-out, to calculate the thickness of the disk 502 it is necessary to take into account the adjustable positioning of the first mounting arm 514 relative to the first mounting base 516 and of the second mounting arm 524 relative to the second mounting base 526. Accordingly, indexing means for measuring such adjustments are provided.

In the brake testing device 500, indicia 528 are provided on the first mounting arm 514 and the second mounting arm 524. The first mounting base 516 and the second mounting base 526 are each provided with reference points 530 as well as means for comparing the indicia 528 to the reference point 530 to determine the position of the mounting arm (514 or 524) with respect to the mounting base (516 or 526). The amount of adjustment of the first mounting arm 514 and the second mounting arm 524 is reflected in the separation between the first sensing surface 512 and the second sensing surface 522. The difference between the separation of the first sensing surface 512 from the second sensing surface 522 and the sum of the instantaneous distances between the first sensing surface 512 and the first disk surface 506 and between the second sensing surface 522 and the second disk surface 508 is equal to the instantaneous thickness of the disk 502.

Figure 11:
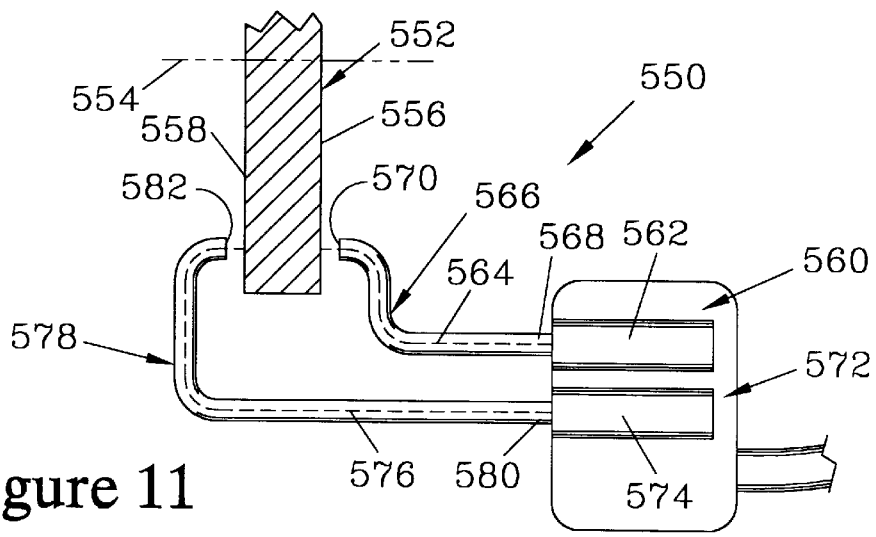
FIG. 11 illustrates another embodiment of the present invention, which employs non-contact gauges. This embodiment employs optical gauges which are provided with light pipes. The light pipes terminate in sensing surfaces which serve as sensing elements. The light pipes are configured to allow the sensing surfaces to be positioned near the surfaces of the disk without removal of the dust shield or the wheel.

FIG. 11 is a schematic view of a brake testing device 550 which uses optical gauges for testing a brake disk 552. The brake disk 552 again has a disk axis 554, a first disk surface 556, and a second disk surface 558.

The brake testing device 550 has a first gauge 560 which is an optical gauge, and preferably a laser gauge. The first gauge 560 has a first emitter/receiver 562 which generates a first emitted light beam 564. The first gauge 560 measures the time required for the first emitted light beam 564 to return after being emitted, which is proportional to the distance traversed by the first emitted light beam 564.

The first gauge 560 is provided with a first light pipe 566, which terminates in a first light pipe base end 568, which receives the first emitted light beam 564 from the first emitter/receiver 562, and a first sensing surface 570, which serves as a first sensing element in this embodiment. The first light pipe 566 is configured to place the first sensing surface 570 near the first disk surface 556. The first sensing surface 570 is configured to direct the first emitted light beam 564 substantially normal to the first disk surface 556. The first light pipe 566 defines a portion of the path traversed by the first emitted light beam 564, the distance of this portion remaining constant. The first emitted light beam 564 is reflected by the first disk surface 556, passes through the first sensing surface 570, and returns along the first light pipe 566 to the first emitter/receiver 562. The distance travelled by the first emitted light beam 564 from the first sensing surface 570, to the first disk surface 556, and back to the first sensing surface 570 is equal to twice the distance between the first sensing surface 570 and the first disk surface 556.

The first gauge 560 includes means for generating position signals proportional to the distance traversed by the first emitted light beam 564 as it traverses a path to and from the first disk surface 556. The portion of the path between the first disk surface 556 and the first sensing surface 570 is substantially normal to the first disk surface 556. Thus, the position signals correspond to the position of the first disk surface 556 as measured in a direction parallel with the disk axis 554.

Similarly, the brake testing device 550 has a second gauge 572 which is an optical gauge. The second gauge 572 has a second emitter/receiver 574 which generates a second emitted light beam 576. A second light pipe 578 is provided, terminating in a second light pipe base end 580, which receives the second emitted light beam 576 from the second emitter/receiver 574, and a second sensing surface 582, which serves as a second sensing element. The second sensing surface 582 is configured to direct the second emitted light beam 576 substantially normal to the second disk surface 558. The second light pipe 578 defines a portion of the path traversed by the second emitted light beam 576. The second emitted light beam 576 is reflected by the second disk surface 558, passes through the second sensing surface 582, and returns along the second light pipe 578 to the second emitter/receiver 574.

The second gauge 572 includes means for generating position signals proportional to the distance traversed by the second emitted light beam 576, these position signals corresponding to the position of the second disk surface 558 as measured in a direction parallel with the disk axis 554.

While the positions measured by the first gauge 560 and the second gauge 572 may be used directly to calculate lateral run-out in the manner discussed above, reference distances traversed by the first emitted light beam 564 and the second emitted light beam 576 must be established to allow calculating the thickness of the disk 552. Such may be readily provided by measuring the total distance traversed by the first emitted light beam 564 and the second emitted light beam 576 when a shim gauge (not shown) of known thickness is placed between the first sensing surface 570 and the second sensing surface 582. A measured instantaneous total distance traversed may then be subtracted from this reference measurement to determine the difference between the known thickness of the shim gauge and the instantaneous thickness of the disk 552.

Figure 12:
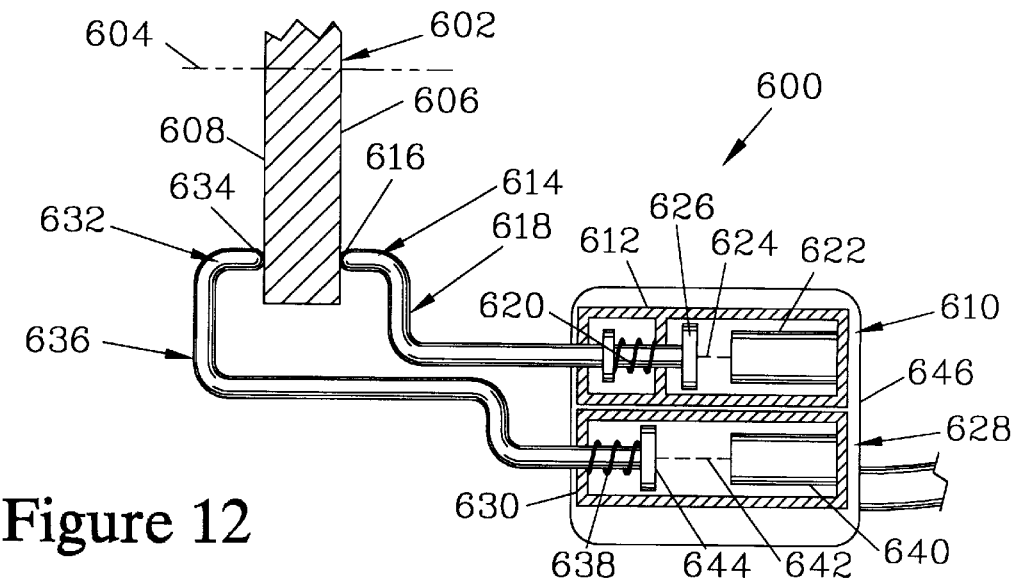
FIG. 12 illustrates another embodiment of the present invention, which employs non-contact sensors as components in contact-type gauges for monitoring the position of the disk surfaces.

While contact and non-contact type gauges are discussed above as separate and distinct gauge types, it should again be noted that contact type gauges such as those shown in FIGS. 1–9 may incorporate non-contact elements to provide the means for generating position signals proportional to the positions of the disk contacting surfaces. FIG. 12 is a schematic view of one embodiment of a brake testing device 600 which employs contact gauges that utilize non-contact sensors to measure the positions of sensing elements which physically contact the disk surfaces. In this embodiment, the contact gauges use optical sensors to test a brake disk 602 having a disk axis 604, a first disk surface 606, and a second disk surface 608.

The brake testing device 600 has a first gauge 610, which has a first gauge body 612 and a first sensing element 614 which is resiliently slidable with respect to the first gauge body 612. The first sensing element 614 has a first disk contacting surface 616, which resiliently engages the first disk surface 606 of the disk 602, and is mounted to a first transfer element 618. The first transfer element 618 is interposed between the first sensing element 614 and the first gauge body 612 and resiliently slidably engages the first gauge body 612. The first transfer element 618 is biassed by a first spring 620, this bias serving to maintain the first disk contacting surface 616 resiliently engaged with the disk 602.

The first gauge body 612 of this embodiment houses a first emitter/receiver 622 that generates a first emitted light beam

624. The first emitter/receiver 622 provides means for generating position signals proportional to the position of the first sensing element 614. The first transfer member 618, to which the first sensing element 614 is mounted, terminates in a first reference surface 626 which is substantially normal to the disk axis 604 and positioned to intercept and reflect the first emitted light beam 624. The configuration of the first sensing element 614 and the first transfer element 618 assures that the first reference surface 626 moves in correspondence with the first disk surface 606.

The first emitter/receiver 622 includes means for generating position signals proportional to the distance traversed by the first emitted light beam 624. These signals change in accordance with the position of the first disk contacting surface 616, which follows the displacement of the first disk surface 606. Thus, the position signals generated by the first emitter/receiver 622 correspond to the position of the first disk surface 606.

Similarly, the brake testing device 600 has a second gauge 628 having a second gauge body 630 and a second sensing element 632. The second sensing element 632 has a second disk contacting surface 634 which resiliently engages the second disk surface 608. The second sensing element 632 is mounted to a second transfer element 636 which is interposed between the second sensing element 632 and the second gauge body 630. The second transfer element 636 resiliently slidably engages the second gauge body 630, being biassed by a second spring 638 to maintain the second disk contacting surface 634 resiliently engaged with the disk 602.

The second gauge body 630 houses a second emitter/receiver 640 that generates a second emitted light beam 642 and provides means for generating position signals proportional to the position of the second sensing element 632. The second transfer member 636, to which the second sensing element 632 is mounted, terminates in a second reference surface 644 which is substantially normal to the disk axis 604 and positioned to intercept and reflect the second emitted light beam 642. The configuration of the second sensing element 632 and the second transfer element 636 assures that the second reference surface 644 moves in correspondence with the second disk surface 606.

The second emitter/receiver 640 includes means for generating position signals proportional to the distance traversed by the second emitted light beam 642. These signals change in accordance with the position of the second disk contacting surface 634, which follows the displacement of the second disk surface 608. Thus, the position signals generated by the second emitter/receiver 640 correspond to the position of the second disk surface 608.

The first gauge body 612 and the second gauge body 630 are mounted to a support frame 646 which is positionable with respect to the disk 602.

For all gauge types discussed above, the first gauge and the second gauge generate position signals which are proportional to the position of the first and second disk surfaces. Preferably, these signals are communicated to means for processing the position signals to provide values for characterizing data for the wear condition of the disk. Such characterizing data typically include thickness characteristic and lateral runout.

Figure 13:
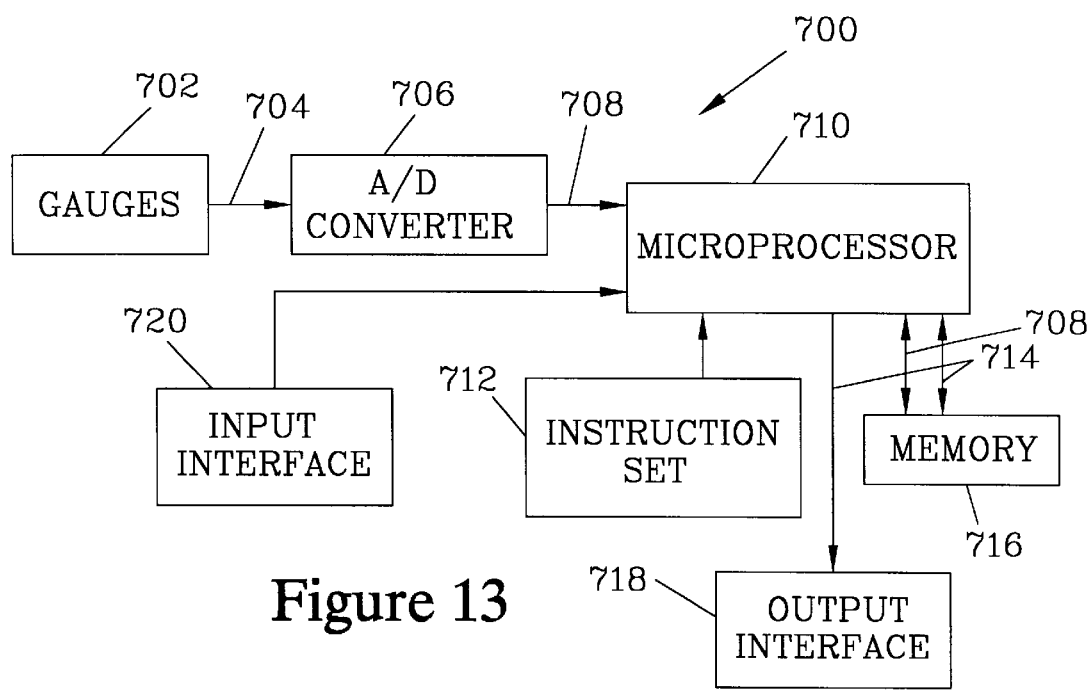
FIG. 13 is a block diagram illustrating a brake testing device which can employ any of the above gauge configurations. The brake testing device of this embodiment employs a microprocessor to calculate values for disk thickness and lateral run-out.

FIG. 13 is a block diagram of a brake testing system 700 which includes a means for calculating values for the thickness and lateral run-out of a disk to characterize the condition of the disk. The nature of the characterization of the thickness can take on various forms, depending in part on the sensitivity of the gauges employed as well as the choice of the analysis employed. However, in all cases, such characterization includes the nominal thickness of the disk.

The brake testing system 700 has a pair of gauges 702, such as those described above. The pair of gauges 702 are axially aligned and positioned to monitor the position of opposite sides of the brake disk as measured along parallel lines. The pair of gauges 702 include means for generating position signals 704 which correspond to the positions of the first disk surface and the position of the second disk surface. These position signals 704 are frequently analog in character and, as noted above, may be proportional to a variety of position related parameters, including velocity and acceleration, from which the positions of the disk surfaces can be determined.

The position measurements are taken by the pair of gauges 702 as a function of the disk position, and are frequently taken in a periodic manner which is either time-dependent or dependant on the angular position of the disk relative to the pair of gauges 702. Time-dependent measurements may be provided by employing a clock circuit which reads the position measurement output of the gauges 702 at a certain point in a timing cycle. Angular position-dependent measurements may be taken by providing an incremental reference index of the relative position of the gauges 702 with respect to the disk, and reading the position measurement output of the gauges 702 as each increment is passed.

If the position signals 704 are analog in character, then an A/D converter 706 is provided for converting the position signals 704 into digital signals 708 which may be processed by a microprocessor 710 which serves as means for processing the position signals to determine the thickness and lateral runout of the disk. The A/D converter 706 may also amplify or otherwise condition the position signals 704 as necessary to provide digital signals 708 which are compatible with the microprocessor 710.

In addition to communicating with the A/D converter 706 to receive the digital signals 708, the brake testing system 700 has an instruction set 712 which contains instructions for directing the microprocessor 710 to operate on the digital signals 708 to generate characterizing data 714 which indicate the condition of the disk. The instruction set 712 can be either code which can be accessed by the microprocessor 710, or may be imbedded in the microprocessor 710. The characterizing data 714 typically include the lateral run-out of the brake disk as well as a characterization of the thickness of the disk, such as the average of all instantaneous thickness measurements taken. As noted above, the exact nature of the thickness characterization depends in part on the sensitivity of the gauges employed. However, in all cases an average thickness should be obtainable.

The brake testing system 700 also has a memory 716 associated with the microprocessor 710 for storing the digital signals 708 and the characterizing data 714. An output interface 718 is provided for the brake testing system 700, which provides the user with the characterizing data 714 so that these values may be compared with standard values for the vehicle being tested to determine whether the brake disk falls within specifications. The output interface 718 may be a visual display, printout, data port, or other device for presenting data to the user.

An input interface 720 is optionally provided to allow the user to input commands and updated instruction sets to the microprocessor 710.

While the brake testing system 700 simplifies brake disk testing by automatically providing characterizing data for the wear condition of a brake disk, the user still must either interpret the data or compare the data to specified standard values to establish the condition of the brake disk. Such interpretation or comparison may require a degree of skill not possessed by the user or be inconvenient to the user, and can introduce a possibility of error in performing the comparison.

To further facilitate brake testing, it is desirable to provide a brake testing system which includes means for performing a comparative analysis as well as means for outputting the results of such analysis.

Figure 14:
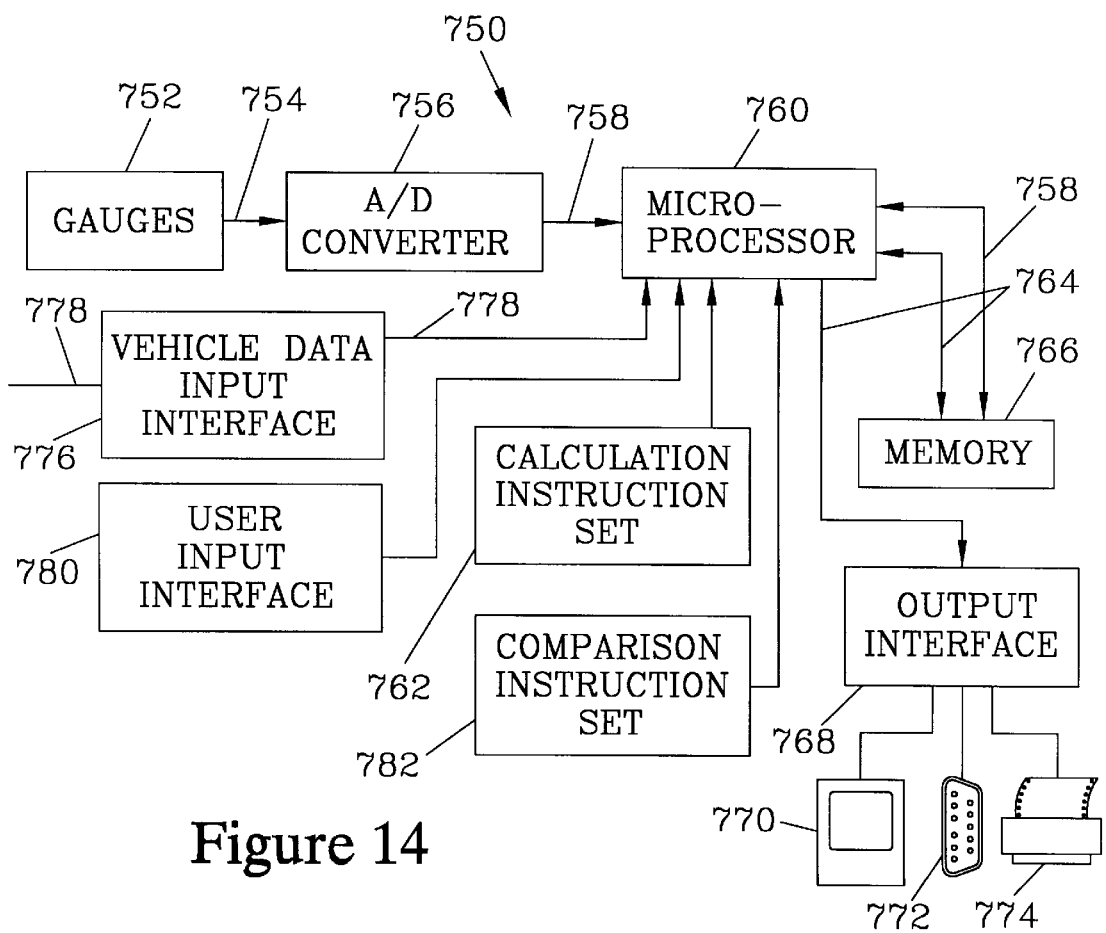
FIG. 14 is a block diagram illustrating another embodiment of the present invention, a brake testing system which employs a microprocessor both to characterize the condition of the disk and to compare the condition to specified standards which are supplied to the brake testing system to establish whether the specified standard is met.

FIG. 14 is a block diagram of one embodiment of a brake testing system 750 which automatically provides values for the lateral run-out and thickness measurements of a disk as well as providing a comparative analysis of such values to determine whether they fall within specified standard values. The brake testing system 750 thus provides notice to the user whether the disk is acceptable, the disk can be repaired, or the disk must be replaced.

The brake testing system 750 includes all the elements of the brake testing system 700 discussed above. The brake testing system 750 has a pair of gauges 752 which generate position signals 754, and an A/D converter 756 which provides digital signals 758 for processing by a microprocessor 760. A calculation instruction set 762 enables the microprocessor 760 to operate on the digital signals 758 to generate calculated values 764 for the run-out and thickness of the disk. A memory 766 communicates with the microprocessor 760 to store the digital signals 758 and the calculated values 764. The microprocessor 760 in turn provides the calculated values 764 to an output interface 768. The output interface 768 directs the information to a display 770, a digital communication port 772, and a printer 774, according to the controls provided by the microprocessor 760.

The brake testing system 750 has a vehicle data input interface 776. The vehicle data input interface 776 allows the user to input manufacturer-specified standard values 778 to the microprocessor 760. These standard values 778 include the minimum or maximum acceptable values for the lateral run-out and thickness of the brake disk for particular vehicles and wheel locations. The vehicle data input interface 776 is an interface compatible with the device from which the standard values 778 are supplied.

If the data is supplied from a readable data storage device, such as a ROM or RAM chip, CD ROM, or floppy disk drive, then the vehicle data input interface 776 is a reader or slot for such. If the standard values 778 are supplied from another system through a communication interface, then a communication interface for supplying information to a partitioned section of the memory 766 reserved for vehicle data can serve as the vehicle data input interface 776. When a communication interface serves as the vehicle data input interface 776, it may also serve other functions and serve as a general communication interface for the microprocessor 760. In either case, the brake testing system 750 is updatable and can be modified through the vehicle data input interface 776. As new vehicles enter the market, either a new data storage device can be added when a readable data storage device is employed or, alternatively, information in a partition of the memory 766 reserved for vehicle data input interface 776 is a communication interface.

The vehicle data provided should include standard values 778 which are indexed with respect to the particular vehicle/wheel for which they are appropriate. The standard values 778 may be stored in an encrypted format when such is desirable to preserve proprietary information.

The brake testing system 750 has a user input interface 780 which allows the user to interact with the microprocessor 760. The user input interface 780 allows the user to identify the vehicle for which the brake disk is being tested, as well as the wheel of the vehicle with which the disk is associated, when such is appropriate. The user input interface 780 is provided by a key board or key pad that allows the user to search through and select data which has been input through the vehicle data input interface 776 and which is shown on the display 770 as a menu, from which the user may select the standard values 778 which correspond to the vehicle and wheel being tested. The selected standard values 778 are employed by the microprocessor 760 for performing an analysis.

In the brake testing system 750, a comparison instruction set 782 instructs the microprocessor 760 to perform a comparative analysis of the calculated values 764 for thickness and lateral runout. The comparison instruction set 782 first directs the microprocessor 760 to access the standard values 778 which the user has selected via the user input interface 780. These selected values from the standard values 778 are then compared to the calculated values 764 stored in the memory 766.

Both the calculation instruction set 762 and the comparison instruction set 782 may be stored in a partitioned section of the memory 766 rather than being burned into the structure of the microprocessor 760 or stored in read-only memory. The vehicle data input interface 776, the user input interface 780, or both may be configured to allow the user to input commands and instructions for instructing the microprocessor 760, allowing the calculation instruction set 762 and the comparison instruction set 782 to be updated.

Typically, for lateral run-out, the standard values 778 have only a maximum allowable value for lateral runout. If the calculated value 764 for the lateral run-out is less than or equal to the maximum allowable value, the disk is considered to fall within acceptable limits for lateral run-out.

For average thickness, the standard values 778 typically include a minimum allowable thickness value, and may additionally include a "machine to" value. If the calculated value 764 for the thickness is greater than the minimum standard value 778, the disk is considered to be acceptable with regard to thickness. If the calculated value 764 for the thickness is greater than the "machine to" standard value 778 and the lateral run-out of the disk is unacceptable, the disk may be machined to bring the lateral run-out into specification, so long as such machining does not reduce its thickness to a thickness less than the "machine to" value.

When the pair of gauges 752 are sufficiently accurate, thickness variation may also be calculated as part of the thickness characterization. If the thickness variation is less than or equal to a maximum variation standard value 778, the thickness variation of the disk is considered to be acceptable. If the thickness is greater than the acceptable variation, and if the thickness is greater than the "machine to" value, then the disk may be machined to reduce the thickness variation.

In the brake testing system 750, results of the comparative analysis are provided through the output interface 768. The display 770 and the printer 774 provide the user with a report of whether the disk does or does not fall within the specified standard values for lateral runout, thickness, and in some instances, thickness variation, as well as providing the calculated values 764.

The brake testing systems (700 and 750) discussed above operate with a single microprocessor, and are typically housed in a single case (such as the case 244 shown in FIGS. 5 and 6). However, since such cases must be located in close proximity to the disk during testing, access to the case may be restricted, making operation of these systems difficult for the user. To further facilitate testing, it is preferred to provide a handheld device which can control operation of the brake testing system. In such instances, two microprocessors are employed.

Figure 16:
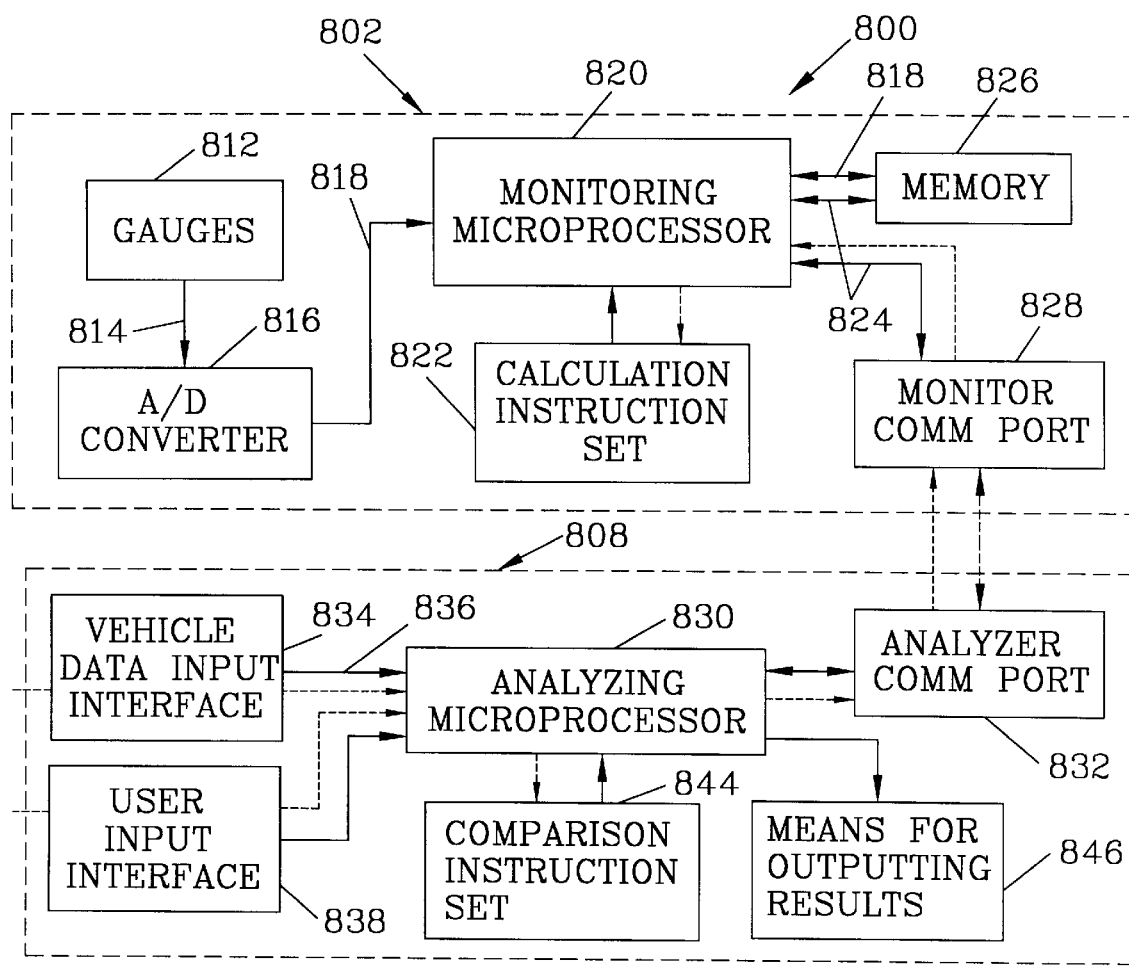
FIG. 16 is a block diagram of the embodiment shown in FIG. 15.

FIGS. 15 and 16 illustrate a brake testing system 800 which forms an embodiment of the present invention where the data collection and processing and the data analysis are performed by separate units which communicate with each other. FIG. 15 is an isometric view of the brake testing system 800, illustrating a monitoring unit 802, housed in a first case 804, which is coupled to a spring 806 of the vehicle (not shown) on which the disk to be tested is mounted. A separate hand-held analysis unit 808 is housed in a second case 810.

FIG. 16 is a diagram illustrating the various components of each of the units (802, 808) of the brake testing system 800.

The monitoring unit 802 of the brake testing system 800 has a pair of gauges 812 that generate analog signals 814. The pair of gauges 812 of this embodiment are similar to those employed by the brake testing device 200 shown in FIGS. 5 and 6.

In addition to the pair of gauges 812, the monitoring unit 802 has an A/D converter 816 which converts the analog signals 814 from the pair of gauges 10 812 to provide digital signals 818. The monitoring unit 802 also has a monitoring microprocessor 820 and a calculation instruction set 822 to enable the monitoring microprocessor 820 to process the digital signals 818 to generate calculated values 824. A memory 826 is provided in the monitoring unit 802 to store the digital signals 818 during processing and store the calculated values 824. A monitor communication port 828 is also provided, which serves to output the calculated values 824 from the monitoring unit 802.

The analysis unit 808 is provided with an analyzing microprocessor 830 and an associated analyzer communication port 832. The analyzer communication port 832 communicates with the monitor communication port 828, allowing transfer of the calculated values 824 to the analyzing microprocessor 830. Since wires are prone to breakage in an automotive testing environment, it is preferred for the monitor communication port 828 and the analyzer communication port 832 to communicate via wireless transmission, such as IR light or radio frequency transmission. Such wireless communication between the monitor communication port 828 and the analyzer communication port 832 also allows the user greater freedom in locating the analysis unit 808 for convenient operation. It should be noted that outputting the calculated values 824 instead of the analog signals 814 or digital signals 818 reduces the amount of information which must be transmitted to the analyzing microprocessor 830, reducing the chances for interference during transmission.

A vehicle data input interface 834 (shown in FIG. 16) is provided for the analysis unit 808. The vehicle data input interface 834 allows the user to provide manufacturer specified standard values 836 to the analyzing microprocessor 830. In the brake testing system 800, the vehicle data input interface 834 is an internal data input port which accepts a readable storage medium, such as a machine readable card or disk, on which the standard values 836 are stored. Since the vehicle data input interface 834 is internal to the second case 810, it is not shown in FIG. 15.

A user input interface 838 is also provided for the analysis unit 808. The user input interface 838 allows the user to select the standard values 836 appropriate for the vehicle and wheel location being analyzed. The user input interface 838 has many of the attributes of the user input interface 780 discussed above, and is located in the second case 810. Since the second case 810 does not need to remain in close proximity to the disk during testing, the second case 810 may be conveniently positioned or hand-held to facilitate user access to the user input interface 838.

The user input interface 838 employs a keypad 840 in combination with a display screen 842 which displays menus of vehicles for which the standard values 836 have been inputted. The keypad 840 allows the user to scroll through and select from menu choices shown on the display screen 842. The keypad 840 includes cursor control keys 840a for directing a cursor through the menus displayed on the display screen 842, a selection key 840b for selecting desired menu options, wheel keys 840c for selecting which wheel of the vehicle is being tested, a help key 840d which causes instructions for the user to be displayed on the display screen 842, and a clear key 840e which clears the data entered by the user.

A comparison instruction set 844 (shown in FIG. 16) is provided for instructing the analyzing microprocessor 830 to perform a comparative analysis of the calculated values 824. In the brake testing system 800, the comparison instruction set 844 is also provided internally to the second case 810, and thus is not shown in FIG. 15.

Means for outputting the results of the comparative analysis 846 are associated with the second case 810 to facilitate accessing such results by the user. In the brake testing system 800, the display screen 842, in addition to serving as part of the user input interface 838, serves as part of the means for outputting the comparison results 846, allowing the comparison results to be displayed on the display screen 842 for the user. The means for outputting the comparison results 846 also includes a printer 848 for providing a hard copy of the comparison results to the user. Preferably, the display screen 842 and the printer 848 also provide the calculated values 824 to the user. The keypad 840 includes a print key 840f for directing the analyzing microprocessor 830 to output information through the printer 848 for the user.

Preferably, the monitoring microprocessor 820 is programmed to operate in response to input provided by the gauges 812 and testing prompts provided by the analyzing microprocessor 830, eliminating a need for the user to directly access the first case 804 during testing.

Figure 17:
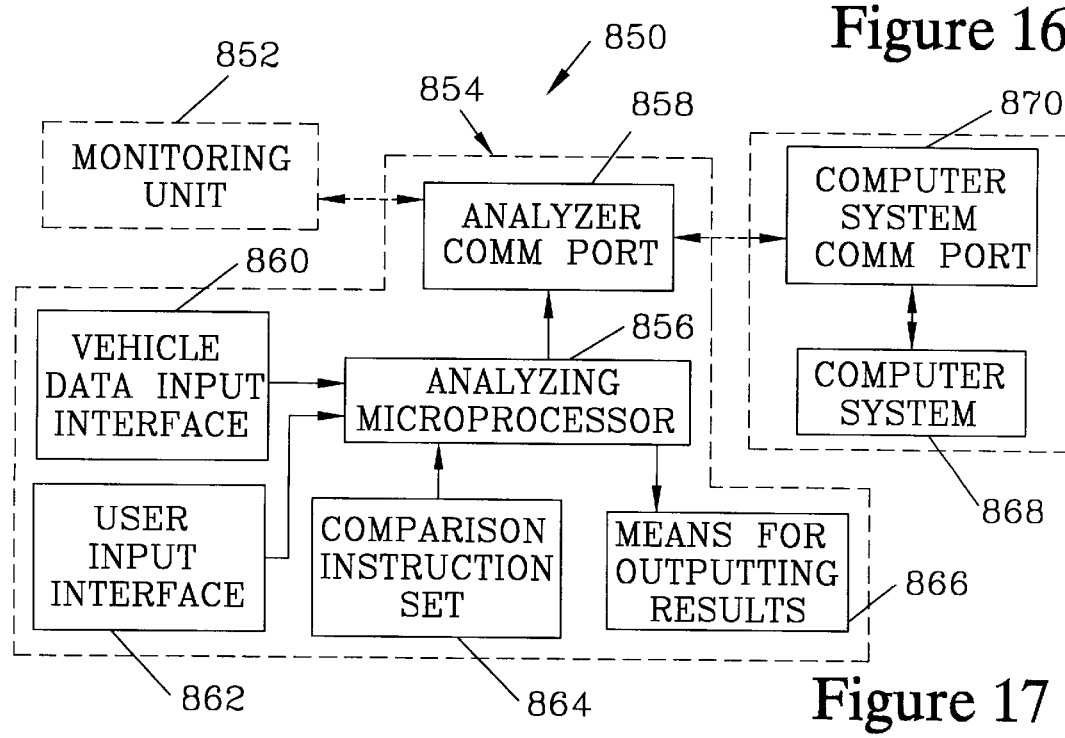
FIG. 17 is a block diagram illustrating another embodiment of the present invention, where the results of the comparative analysis are provided to a computer system. The computer system may use the results for various purposes, such as further analysis or recording in a client database.

FIG. 17 is a block diagram of a brake testing system 850 which forms another embodiment of the present invention. The brake testing system 850 has a monitoring unit 852, which is similar to the monitoring unit 802 of the brake testing system 800 discussed above. The monitoring unit 852 communicates with an analysis unit 854, which shares many features in common with the analysis unit 808 discussed above. The analysis unit 854 has an analyzing microprocessor 856, an analyzer communication port 858 which communicates with the monitoring unit 852, a vehicle data input interface 860, a user input interface 862, a comparison instruction set 864, and a means for outputting results 866.

In the brake testing system 850, the results of the comparative analysis are not only provided to the user by the means for outputting results 866, but are also provided to a computer system 868. The computer system 868 communicates with the analyzer communication port 858 via a computer system communication port 870. The computer system 868 may be any of a variety of computerized systems for making use of the comparison results, such as a computer system for maintaining customer vehicle records.

Figure 18:
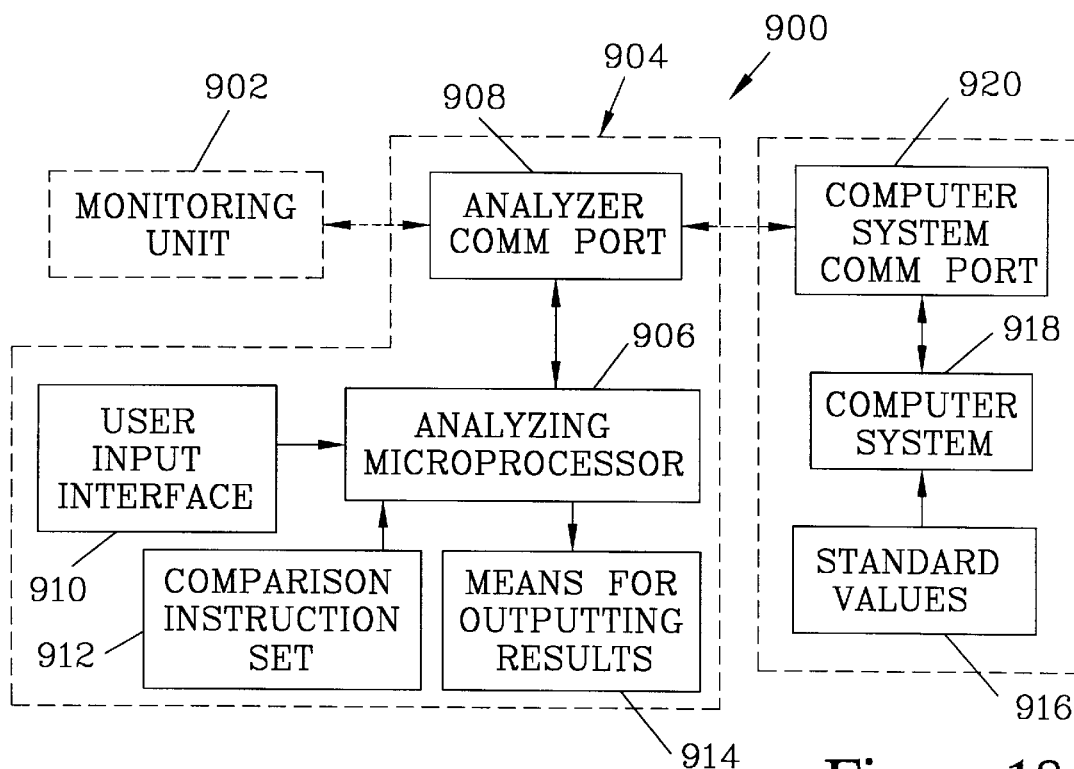
FIG. 18 is a block diagram illustrating another embodiment of the present invention having a computer system. In this embodiment, specified standard values are inputted to the computer system and communicated to the analyzing microprocessor to allows multiple brake testing systems to share a common set of inputted standards.

FIG. 18 is a block diagram of a brake testing system 900 which forms yet another embodiment of the present invention. The brake testing system 900 again has a monitoring unit 902 and an analysis unit 904. The analysis unit 904 has an analyzing microprocessor 906, an analyzer communication port 908 which communicates with the monitoring unit 902, a user input interface 910, a comparison instruction set 912, and a means for outputting results 914.

In this embodiment, standard values 916 are made accessible to a computer system 918 having a computer system communication port 920. The standard values 916 are communicated to the analyzing microprocessor 906 via the computer system communication port 920 and the analyzer communication port 908. By providing the standard values 916 to the computer system 918, additional analysis units 904 may be employed which share a single set of standard values 916. Using a single set of standard values 916 reduces the expense and effort required to obtain and maintain the standard values 916 when it is desirable to employ multiple monitoring units 902 and analysis units 904.

Figure 19:
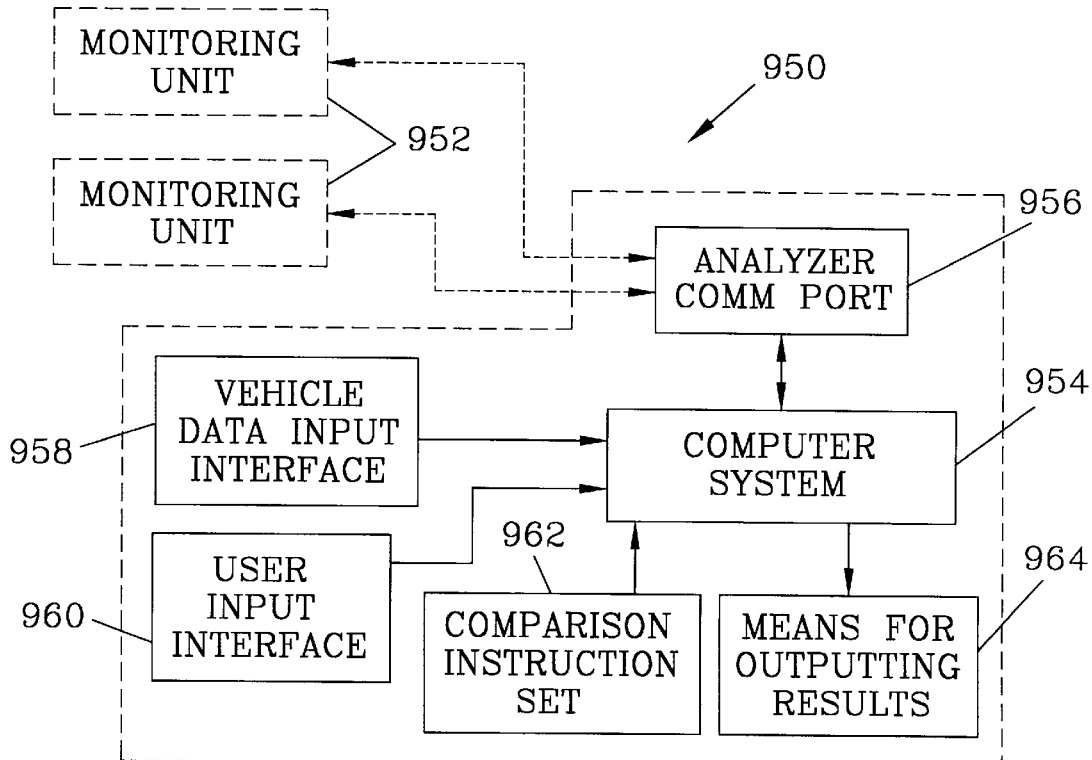
FIG. 19 is a block diagram illustrating another embodiment of the present invention having a computer system. In this embodiment, the computer system provides the functions of an analyzing microprocessor in addition to its other functions.

FIG. 19 is a block diagram of a brake testing system 950 which forms another embodiment of the present invention which facilitates use of multiple monitoring units 952. The brake testing system 950 has two monitoring units 952, which are each similar to the monitoring unit 802 discussed above. Each monitoring unit 952 communicates directly with a computer system 954 via an analyzer communication port 956. In this embodiment, the computer system 954 provides the functions of an analyzing microprocessor in addition to its other functions. The computer system 954 has vehicle data input interface 958 for input of standard values, a user input interface 960 for input of operating instructions, a comparison instruction set 962, and a means for outputting results 964.

While the novel features of the present invention have been described in terms of particular embodiments and preferred applications, it should be appreciated by one skilled in the art that substitution of materials and modification of details obviously can be made without departing from the spirit of the invention.

What I claim is:

1. A brake testing device for testing the condition of a disk of a wheel mounting assembly, the disk having, a disk axis, a first disk surface, and a second disk surface, the first disk surface and the second disk surface being separated by a nominal disk thickness T, with the first disk surface and the second disk surface being substantially normal to the disk axis, the brake testing device comprising:

a first gauge having a first sensing element for measuring the position of the first disk surface along a line parallel to the disk axis;

a second gauge having a second sensing element for measuring the position of the second disk surface along a line parallel to the disk axis;

means for generating position signals corresponding to said measured position of the first disk surface and said measured position of the second disk surface;

means for outputting said position signals;

means for securing said first gauge with respect to said second gauge such that said first sensing element and said second sensing element measure positions along lines which are substantially parallel; and means for positioning and maintaining said first gauge and said second gauge with respect to the disk such that said first sensing element and said second sensing element measure positions along lines which are substantially equidistant from the disk axis.

2. The brake testing device of claim 1 wherein said first gauge and said second gauge are contact gauges, said first gauge having a first gauge body, said first sensing element being movable with respect to said first gauge body and having a first disk contacting surface which resiliently contacts and follows the contour of the first disk surface, and said second gauge having a second gauge body, said second sensing element being movable with respect to said second gauge body and having a second disk contacting surface which resiliently contacts and follows the contour of the second disk surface.

3. The brake testing device of claim 2 wherein said first gauge body and said second gauge body reside on the same side of the disk, the brake testing device further comprising:

a first transfer element interposed between and communicating with one of said first sensing element and said second sensing element and its associated gauge body.

4. The brake testing device of claim 2 further comprising means for maintaining said first disk contacting surface and said second disk contacting surface at a separation S which is greater than the disk thickness T.

5. The brake testing device of claim 3 further comprising means for temporarily maintaining said first disk contacting surface and said second disk contacting surface at a separation S which is greater than the disk thickness T.

6. The brake testing device of claim 5 wherein a wheel is mounted to the wheel mounting assembly and a dust shield is provided for the disk, the dust shield having an access blister, further wherein said first transfer element is associated with said first gauge and is configured to allow placing said first disk contacting surface under the access blister, the brake testing device further comprising:

a second transfer element interposed between and communicating with said second sensing element and said second gauge body, said second transfer element being configured to pass between the wheel and the disk.

7. The brake testing device of claim 1 wherein said first gauge and said second gauge are non-contact gauges, said first sensing element being a first sensing surface positioned near the first disk surface and said second sensing element being a second sensing surface positioned near the second disk surface.

8. The brake testing device of claim 7 wherein said first gauge and said second gauge are provided by electromagnetic field sensors having radiating surfaces which serve as said sensing surfaces, said means for securing said first gauge with respect to said second gauge further comprising:

a support frame which is fixably positioned with respect to the disk;

a first mounting arm adjustably mounted with respect to said support frame, said first gauge being mounted to said first mounting arm; and a second mounting arm adjustably mounted with respect to said support frame, said second gauge being mounted to said second mounting arm.

9. The brake testing device of claim 7 wherein said first gauge and said second gauge are optical gauges, the brake testing device further comprising:

a first light pipe incorporated into said first gauge, said first light pipe terminating in said first sensing surface; and a second light pipe incorporated into said second gauge, said second light pipe terminating in said second sensing surface.

10. The brake testing device of claim 1 wherein the brake testing device forms a brake testing system, the system further comprising:

means for processing said position signals to determine the thickness and lateral run-out of the disk.

11. The brake testing system of claim 10 wherein said means for processing said position signals to determine the thickness and lateral run-out of the disk further comprise:

a microprocessor for operating on said position signals;

an instruction set to enable said microprocessor to generate output data, said output data including calculated values for the thickness and lateral run-out of the disk;

at least one output interface for providing access to said output data.

12. The brake testing system of claim 11 wherein said position signals are analog signals, the brake testing system further comprising:

an a/d converter for converting said position signals to digital signals for processing by said microprocessor.

13. The brake testing system of claim 12 further comprising:

at least one input interface.

14. The brake testing system of claim 13 wherein said at least one input interface further comprises:

a key pad; and a data input port; and further wherein said at least one output interface further comprises:
a display screen; and
a data output port.

15. The brake testing system of claim 14 wherein said means for securing said first gauge with respect to said second gauge further comprises:

a support frame for mounting said first gauge and said second gauge; and a case attached to said support frame for housing said means for processing said position signals to determine the thickness and lateral run-out of the disk.

16. A brake disk testing system for testing a disk of a wheel mounting assembly having a disk axis, the brake disk testing system comprising:

a pair of gauges which are aligned and which monitor the positions of opposite sides of the brake disk as measured along lines substantially parallel to and equidistant from the disk axis;

means for generating position signals corresponding to the positions;

an a/d converter for converting said position signals to digital signals;

a monitoring microprocessor for processing said digital signals;

a calculation instruction set for directing said monitoring microprocessor to operate on said digital signals to provide characterizing data for the condition of the disk;

memory for storing said digital signals and said characterizing data; and output means for presenting said characterizing data.

17. The brake disk testing system of claim 16 wherein said output means for presenting said characterizing data is a display screen, the brake disk testing system further comprising:

a user input interface for the input of data and instructions by the user into said monitoring microprocessor.

18. A brake disk testing system for testing a disk while the disk is mounted on a vehicle, the system comprising:

a pair of gauges which are aligned and which monitor the positions of opposite sides of the brake disk;

means for generating position signals corresponding to the positions;

an a/d converter for converting said position signals to digital signals;

a monitoring microprocessor for processing said digital signals;

a calculation instruction set for directing said monitoring microprocessor to operate on said digital signals to provide characterizing data for the condition of the disk;

memory for storing said digital signals and said characterizing data; and output means for presenting said characterizing data.

19. The brake disk testing system of claim 18 further comprising:

a vehicle data input interface for loading vehicle data including standard values; and a user input interface for allowing the user to select appropriate vehicle data for the vehicle being tested;

means for performing a comparative analysis using said selected vehicle data and said characterizing data to determine whether said characterizing data fall within said standard values for the vehicle; and means for outputting the results of said comparative analysis.

20. The brake disk testing system of claim 19 wherein said means for outputting the results of said comparative analysis includes a visual display and said user input interface has capacity for interacting with said visual display, the brake disk testing system further comprising:

means for generating menus on said visual display, said menus displaying options provided via said vehicle data input interface; and means for making selections of desired options from said menus via said user input interface.

21. The brake disk testing system of claim 20 wherein said monitoring microprocessor has a monitor communication port for transferring information to and from said monitoring microprocessor, further wherein said means for performing a comparative analysis further comprises:

an analyzing microprocessor having an analyzer communication port which communicates with said monitor communication port; and further wherein said user input interface, said vehicle data input interface, and said means for outputting the results of said comparative analysis are associated with said analyzing microprocessor.

22. The brake disk testing system of claim 21 wherein said monitoring microprocessor and said monitor communication port are housed in a first case, and further wherein said analyzing microprocessor and said analyzer communication port are housed in a second case, with said user input interface, said vehicle data input interface, and said visual display being associated with said second case.

23. The brake disk testing system of claim 22 wherein said monitor communication port and said analyzer communication port are infrared ports.

24. The brake disk testing system of claim 22 wherein said monitor communication port and said analyzer communication port are radio ports.

* * * * *